(12) United States Patent
Matsumoto et al.

(10) Patent No.: US 8,628,252 B2
(45) Date of Patent: Jan. 14, 2014

(54) WATERPROOF CONNECTOR AND WATERPROOF DEVICE USING THE SAME

(75) Inventors: Shinichi Matsumoto, Shinagawa-ku (JP); Yasuhiro Masuzaki, Shinagawa-ku (JP); Kiyoshi Jokura, Shinagawa-ku (JP); Hiroshi Miyabayashi, Chigasaki (JP)

(73) Assignees: Hirose Electric Co., Ltd., Tokyo (JP); Sei Optifrontier Co., Ltd., Yokohama-shi (JP)

( * ) Notice: Subject to any disclaimer, the term of this patent is extended or adjusted under 35 U.S.C. 154(b) by 1001 days.

(21) Appl. No.: 12/709,299

(22) Filed: Feb. 19, 2010

(65) Prior Publication Data

US 2010/0215322 A1 Aug. 26, 2010

(30) Foreign Application Priority Data

Feb. 26, 2009 (JP) .................................. 2009-44378

(51) Int. Cl.
*G02B 6/36* (2006.01)
*G02B 6/38* (2006.01)
*H01R 13/52* (2006.01)

(52) U.S. Cl.
USPC .................. 385/56; 385/71; 385/86; 439/281

(58) Field of Classification Search
USPC ..................... 385/54, 55, 56, 71, 86; 439/281
See application file for complete search history.

(56) References Cited

U.S. PATENT DOCUMENTS

| 5,764,834 | A | 6/1998 | Hultermans |
| 7,234,877 | B2 | 6/2007 | Sedor |
| 7,325,980 | B2 | 2/2008 | Pepe |
| 7,338,214 | B1 | 3/2008 | Gurreri et al. |
| 2002/0006253 | A1 | 1/2002 | Marchi |
| 2002/0076164 | A1 | 6/2002 | Childers et al. |
| 2005/0215101 | A1 | 9/2005 | Pepe |

FOREIGN PATENT DOCUMENTS

| JP | 2007-537462 | 12/2007 |
| WO | WO 2005/101078 | 10/2005 |
| WO | WO 2008/128940 | 10/2008 |

*Primary Examiner* — Ryan Lepisto
*Assistant Examiner* — Erin Chiem
(74) *Attorney, Agent, or Firm* — Cozen O'Connor

(57) ABSTRACT

There is provided a waterproof connector. The waterproof connector comprises a connector member supporting a ferrule to be butted against a target ferrule disposed in a target connector, the connector member being adapted to be locked to an adapter member of the target connector by an action of a lock operation portion provided in the connector member; unlocking means being adapted to operate the lock operation portion to release the locked state; and a housing body allowing the unlocking means to be slidably moved. The waterproof connector is adapted to be released from the connection with the target connector in such a manner that the unlocking means is allowed to be moved away from the connector member, whereby the unlocking means is operable to operate the lock operation portion to release the locked state, and to move the connector member away from the adapter member to release the fitting.

15 Claims, 21 Drawing Sheets

WATERPROOF CONNECTOR AND WATERPROOF DEVICE USING THE SAME

BACKGROUND OF THE INVENTION (i) Field of the Invention

The present invention relates to a waterproof connector, and a waterproof device using the waterproof connector.

(ii) Description of the Related Art

One example of a conventional waterproof device is disclosed in JP 2007-537462A (hereinafter referred to as "Patent Document 1"). FIGS. 21 and 22 are perspective views showing a waterproof device disclosed in the Patent Document 1. This waterproof device comprises a combination of a waterproof (sealed) connector 201 and a target connector 200. FIG. 21 is a front perspective view of the waterproof connector 201, and FIG. 22 is a perspective view showing the waterproof connector 201 together with the target connector 200 detachably connectable with the waterproof connector 201, in a state before connection therebetween.

As shown in FIGS. 21 and 22, the waterproof connector 201 primarily comprises an inner fiber connector assembly 206, an inner connector housing 280 supporting the inner fiber connector assembly 206, and a collar member 210 externally covering the inner connector housing 280 in a rotatable manner. In particular, the inner fiber connector assembly 206 includes a cantilever beam portion 122, which has a latch provided on the side of an end thereof to be connected to the another connector 200, and defined by a ramped surface 124 and a locking edge 126, so as to establish a locked state with the target connector 200.

The target connector 200 has an opening 202 adapted to receive an end region of the inner fiber connector assembly 206 of the waterproof connector 201 during connection with the waterproof connector 201. The opening 202 has a complementary alignment structure adapted to receive and latch into engagement with the locking edge 126 of the inner fiber connector assembly 206. This structure makes it possible to allow the target connector 200 and the waterproof connector 201 to be mutually locked during connection therebetween.

The locked state can be easily released by rotating the collar member 210 of the waterproof connector 201 with respect to the inner connector housing 280 in the arrowed direction "j" in FIG. 21. Specifically, along with the rotation of the collar member 210, a cam member 260 is rotated, so that a cam face 266 of the cam member 260 is engaged with a top contact surface 119 of a lock mechanism (latch) 114 to deflect (bend) the lock mechanism 114 so as to release the locked state between the cantilever beam portion 122 of the waterproof connector 201 and the opening 202 of the target connector 200, and the connection between the waterproof connector 201 and the target connector 200.

The conventional waterproof connector disclosed in the Patent Document 1 is configured such that the collar member 210 is rotated with respect to the inner connector housing 280 to allow the cam face 266 to deflect the lock mechanism 114 so as to release the locked state. In this configuration, it is difficult to figure out whether the locked state between the cantilever beam portion 122 of the waterproof connector 201 and the opening 202 of the target connector 200 is actually released. Moreover, it is necessary to release the locked state through a relatively complicated operation, specifically, a two-step operation consisting of "an operation of rotating the collar member 210" and "a pull-out operation".

Under the circumstances, the present invention intends to provide a waterproof connector capable of being connected to a target connector and released from the connection with the target connector, through a single-step operation, while facilitating checking of release of a locked state, and a waterproof device using the waterproof connector.

SUMMARY OF THE INVENTION

It is a primary object of the present invention to provide a waterproof connector, which comprises: a connector member supporting a ferrule to be butted against a target ferrule disposed in a target connector, wherein the connector member is adapted to be detachably fitted into an adapter member provided in the target connector to support the target ferrule, in such a manner as to allow the ferrule to be butted against the target ferrule, and then locked to the adapter member to maintain the butting between the ferrule and the target ferrule, by an action of a lock operation portion provided in the connector member; unlocking means supporting the connector member while allowing the connector member to be freely moved within a given distance along a butting direction of the target ferrule and the target ferrule, wherein the unlocking means is adapted, when it is moved toward a side opposite to the target connector along the butting direction, to operate the lock operation portion to release the locked state between the connector member and the adapter member; a generally cylindrical-shaped joining member protruding toward the target connector along the butting direction, wherein the joining member is adapted to be fixed to a cylindrical portion of the target connector protruding toward the connector member while surrounding a periphery of the adapter member along the butting direction, and, when it is fixed to the cylindrical portion, to form an overlapping region with the cylindrical portion along the butting direction; and a housing body supporting the joining member, and supporting the unlocking means while allowing the unlocking means to be slidably moved within a given distance along the butting direction, wherein: the waterproof connector is adapted to be connected to the target connector in such a manner that the housing body is moved toward the target connector along the butting direction to allow the unlocking means supported by the housing body to be moved closer to the connector member supported by the unlocking means and then allow the connector member supported by the unlocking means to be moved closer to the adapter member and fitted into the adapter member, while allowing the joining member supported by the housing body to be moved closer to the cylindrical portion, and then the joining member is fixed to the cylindrical portion while slidingly moving the housing body along the butting direction; and the waterproof connector is adapted to be released from the connection with the target connector in such a manner that the fixing between the joining member and the cylindrical portion is released while slidingly moving the housing body along the butting direction, and then the housing body is moved toward the side opposite to the target connector along the butting direction to allow the joining member supported by the housing body to be moved away from the cylindrical portion, and allow the unlocking means supported by the housing body to be moved away from the connector member supported by the unlocking means, whereby the unlocking means is operable to operate the lock operation portion provided in the connector member, to release the locked state between the adapter member and the connector member, and to move the connector member supported thereby away from the adapter member to release the fitting between the connector member and the adapter member.

According to one embodiment of the present invention, the waterproof connector comprises an elastic member disposed between the unlocking means and the housing body, wherein the unlocking means is constantly biased by the elastic member, toward the target connector along the butting direction.

According to another embodiment of the present invention, the waterproof connector comprises a coupling member disposed in a space defined by two concave portions formed in respective ones of an outer wall of the unlocking means and an inner wall of the housing body and communicated in a direction intersecting with the butting direction, wherein the housing body supports the unlocking means through the coupling member, to allow the unlocking means to be slidably moved within a given distance along the butting direction.

According to another embodiment of the present invention, in the above waterproof connector, the unlocking means supported by the housing body is adapted to be moved closer to the connector member through the coupling member.

According to another embodiment of the present invention, in the above waterproof connector, the unlocking means supported by the housing body is adapted to be moved away from to the connector member through the coupling member.

According to another embodiment of the present invention, in the waterproof connector, the connector member is supported by the unlocking member in a freely movable manner along the butting direction, in such a manner as to penetrate through a through-hole formed in the unlocking means, wherein a movement of the connector member toward the target connector is restricted through a collision between a protrusion provided on an outer surface of the connector member and a front wall of the unlocking means defining a front opening of the through-hole, in the butting direction, and a movement of the connector member toward the side opposite to the target connector is restricted through a collision between a collision member provided at a rear end of the connector member and a rear wall of the unlocking means defining a rear opening of the through-hole, in the butting direction.

According to another embodiment of the present invention, in the above waterproof connector, the connector member supported by the unlocking means is adapted to be moved closer to the adapter member by means of the collision between the protrusion provided on the outer surface of the connector member and the front wall of the unlocking means defining the front opening of the through-hole, in the butting direction.

According to another embodiment of the present invention, in the above waterproof connector, the connector member supported by the unlocking means is adapted to be moved away from the adapter member by means of the collision between the collision member provided at the rear end of the connector member and the rear wall of the unlocking means defining the rear opening of the through-hole, in the butting direction.

According to another embodiment of the present invention, in the waterproof connector, the lock operation portion has a tab formed to protrude in the butting direction and have a distal end region protruding toward the lock operation portion to wrap around a free end of the lock operation portion, wherein the unlocking means is adapted to operate the lock operation portion using the tab to release the locked state between the adapter member and the connector member.

According to another embodiment of the present invention, in the waterproof connector, the joining member is freely fitted onto the housing body.

According to another embodiment of the present invention, in the waterproof connector, the housing body has a tubular portion protruding toward the target connector along the butting direction to form an overlapping region with an inner periphery of the cylindrical portion along the butting direction when the joining member is fixed to the cylindrical portion, wherein, when the waterproof connector is connected to the target connector, the joining member is disposed to cover an outer periphery of the cylindrical portion of the target connector, and the cylindrical portion of the target connector is inserted in a gap defined between the joining member and the tubular portion of waterproof connector.

According to another embodiment of the present invention, the waterproof connector comprises a holding member disposed within the housing body and fixed to a rigid cord member extending inside the housing body together with an optical fiber connected to the ferrule, wherein the holding member is adapted, when the rigid cord member is pulled toward the side opposite to the target connector along the butting direction, to be brought into contact with an inner wall of the housing body to reduce a force to be applied to the optical fiber.

According to another embodiment of the present invention, in the waterproof connector, the connector member has a structure of an LC connector.

It is another object of the present invention to provide a waterproof device, which comprises the above waterproof connector, and a target connector connectable with the waterproof connector.

It is a further object of the present invention to provide a waterproof connector which comprises: a connector member supporting a ferrule to be butted against a target ferrule disposed in a target connector, wherein the connector member is adapted to be locked to an adapter member of the target connector to maintain the butting between the ferrule and the target ferrule, by an action of a lock operation portion provided in the connector member; unlocking means supporting the connector member while allowing the connector member to be freely moved along a butting direction of the ferrule and the target ferrule, wherein the unlocking means is adapted, when it is moved toward a side opposite to the target connector along the butting direction, to operate the lock operation portion to release the locked state between the connector member and the adapter member; and a housing body supporting the unlocking means while allowing the unlocking means to be slidably moved along the butting direction, wherein: the waterproof connector is adapted to be connected to the target connector in such a manner that the housing body is moved toward the target connector along the butting direction to allow the unlocking means supported by the housing body to be moved closer to the connector member and then allow the connector member supported by the unlocking means to be moved closer to the adapter member and fitted into the adapter member; and the waterproof connector is adapted to be released from the connection with the target connector in such a manner that the housing body is moved toward the side opposite to the target connector along the butting direction to allow the unlocking means supported by the housing body to be moved away from the connector member supported by the unlocking means, whereby the unlocking means is operable to operate the lock operation portion provided in the connector member, to release the locked state between the adapter member and the connector member, and to move the connector member supported thereby away from the adapter member to release the fitting between the connector member and the adapter member.

As above, the present invention can provide a waterproof connector capable of being connected to a target connector and released from the connection with the target connector, through a single-step operation, and a waterproof device using the waterproof connector.

DETAILED DESCRIPTION OF THE PREFERRED EMBODIMENTS

Hereinafter, an embodiment of the present invention will be described with reference to the drawings.

Figure 1:
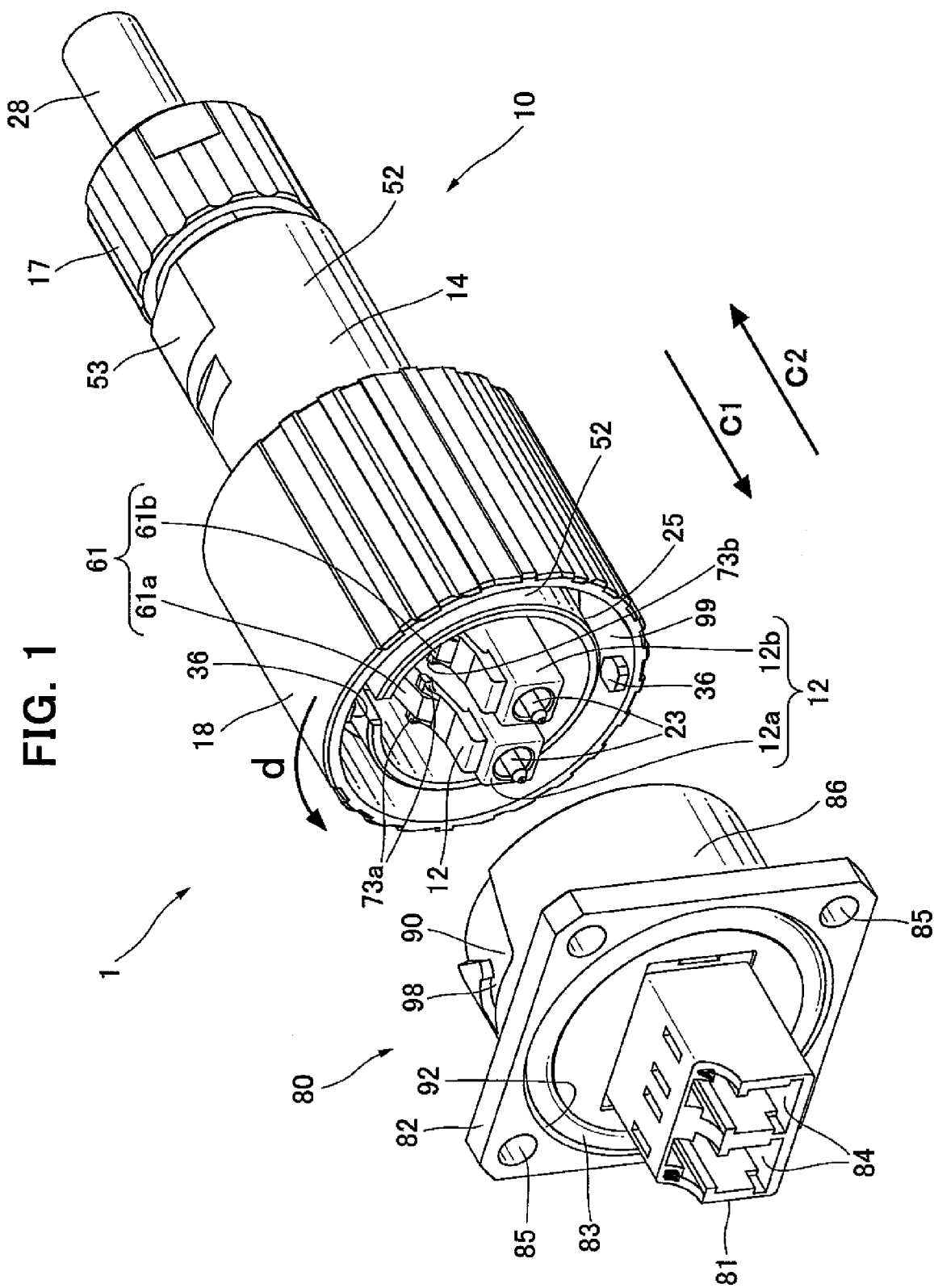
FIG. 1 is an external perspective view showing a waterproof device according to one embodiment of the present invention.
Figure 2:
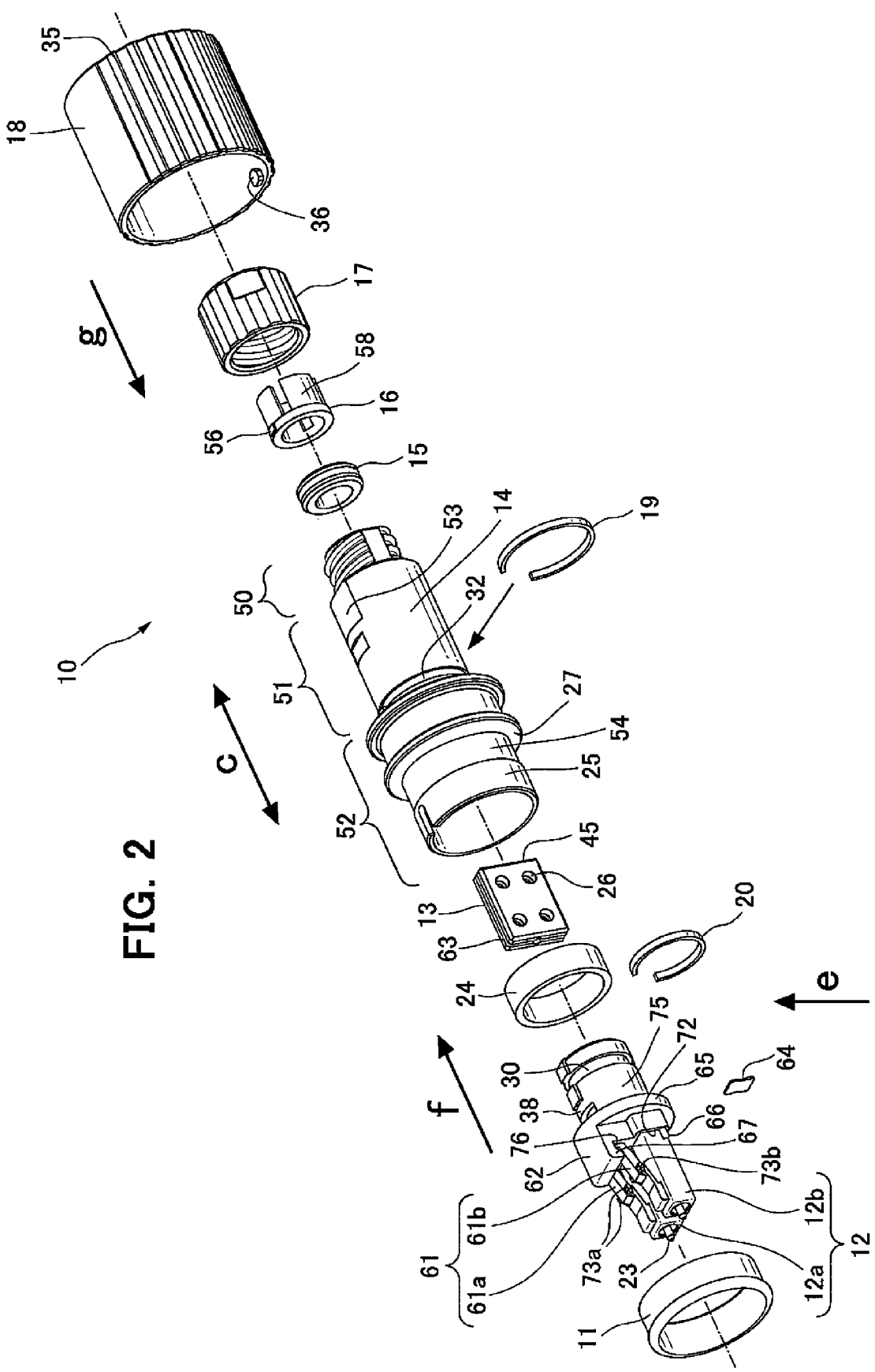
FIG. 2 is an exploded perspective view showing a waterproof connector (plug connector) in the waterproof device according to the embodiment.
Figure 3:
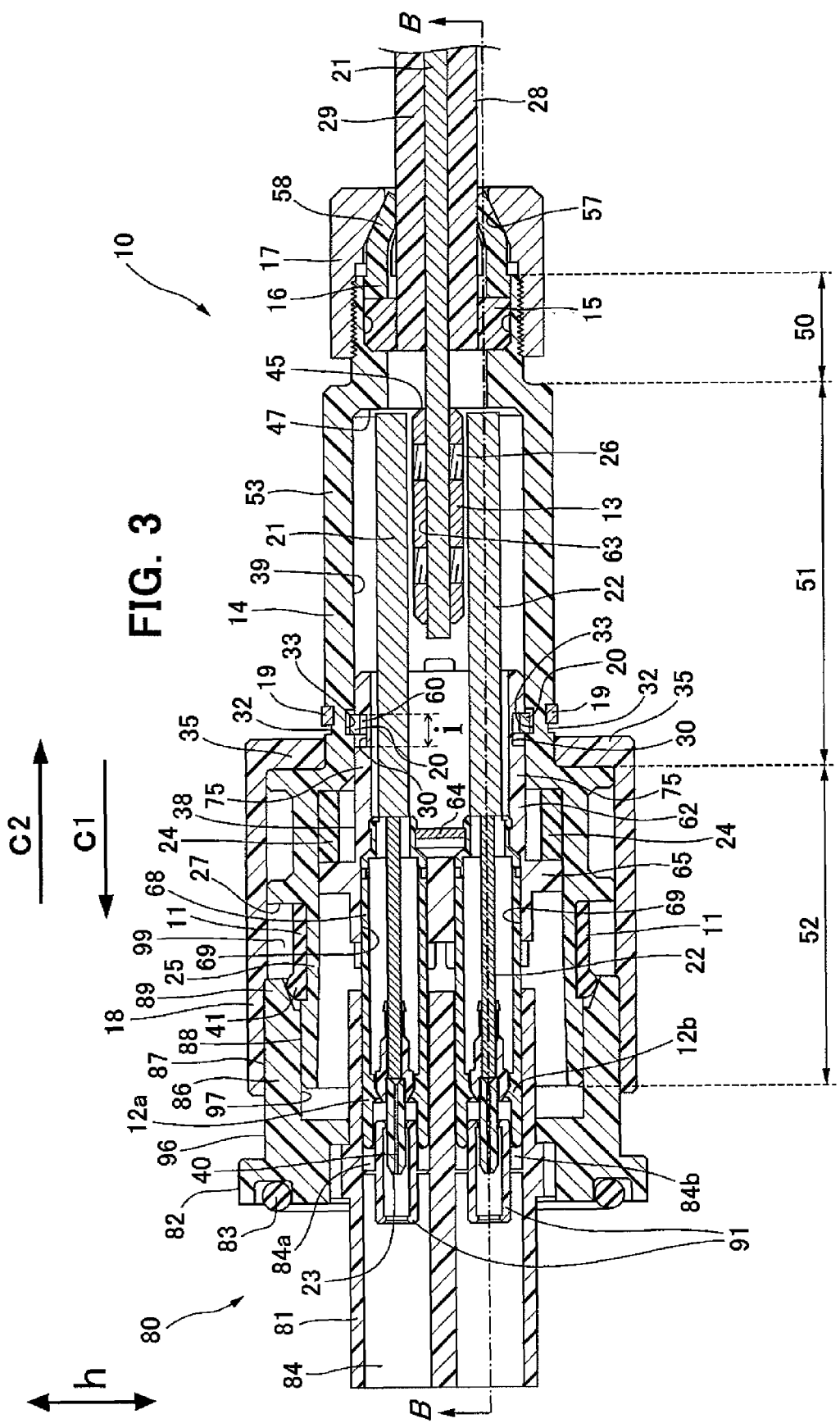
FIG. 3 is a horizontal sectional view showing the waterproof connector and a target connector (receptacle connector) in the waterproof device according to the embodiment, taken along an axis thereof.
Figure 4:
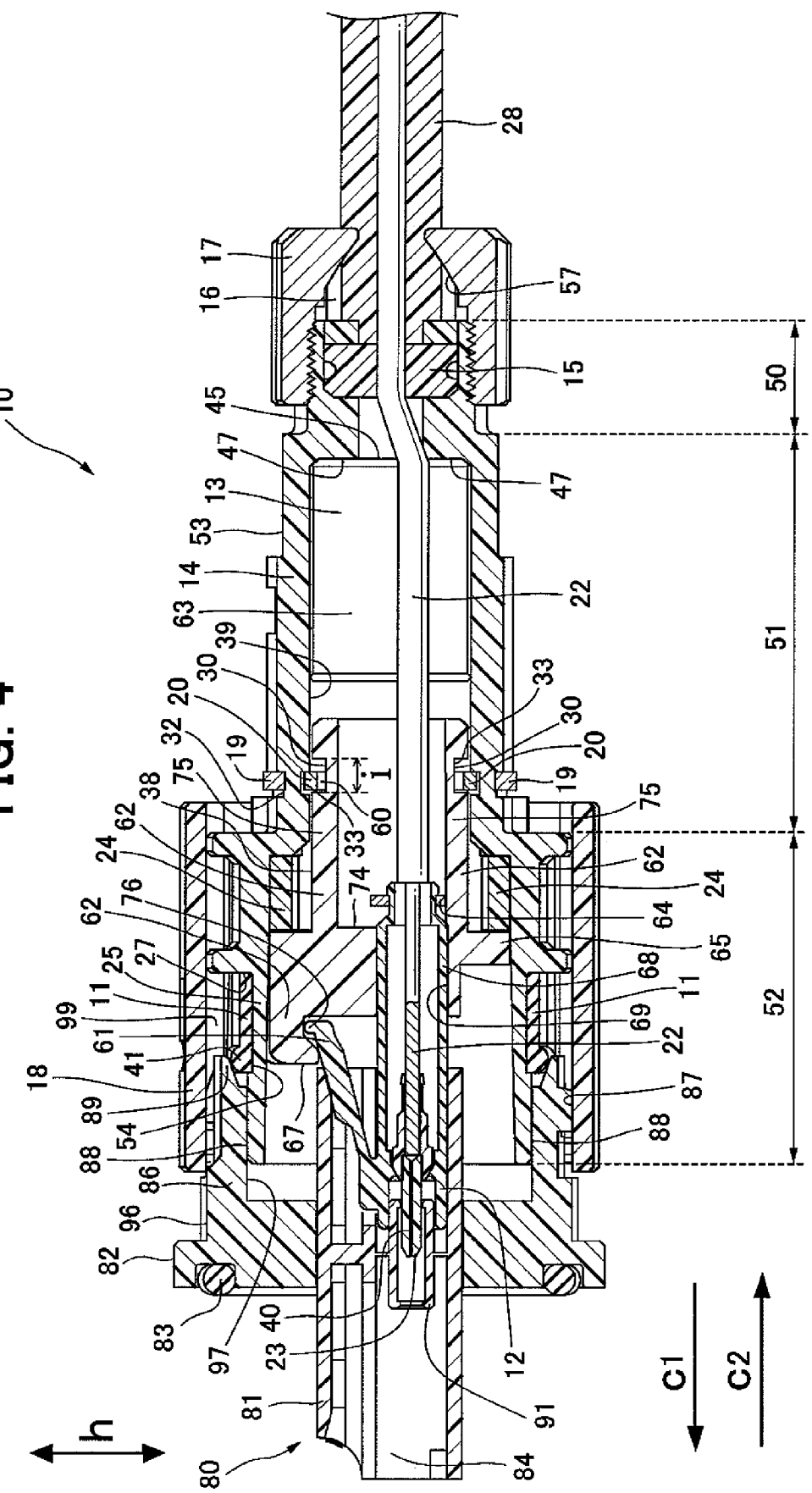
FIG. 4 is a vertical sectional view taken along the line B-B in FIG. 3.

FIG. 1 is an external perspective view showing a waterproof device 1 according to one embodiment of the present invention. The waterproof device 1 comprises a combination of a plug connector (waterproof connector) 10 and a receptacle connector (target connector) 80, which are adapted to be connected together. FIG. 2 is an exploded perspective view showing only the plug connector 10. FIG. 3 a horizontal sectional view showing the plug connector 10 and the receptacle connector 80, taken along an axis of the waterproof device, and FIG. 4 is a vertical sectional view taken along the line B-B in FIG. 3. For convenience of illustration, FIG. 1 shows a state before connection between the plug connector 10 and the receptacle connector 80, and FIGS. 3 and 4 show a state after connection therebetween.

The receptacle connector 80 may be used, for example, under a condition that it is fixed to a wall (not shown) by a screw (not shown) provided to penetrate through a screw hole 85 formed therein. In this case, in order to prevent formation of a gap between the wall and the receptacle connector 80, an O-ring 83 may be installed in an annular-shaped recess 92 formed in a R shell 82 thereof. The O-ring 83 makes it possible to close a gap between the wall and the receptacle connector 80 so as to more reliably keep out water.

The plug connector 10 and the receptacle connector 80 are fixed to each other by a bayonet connection, so as to maintain a connected state therebetween. In order to establish the fixing based on the bayonet connection, a pair of fixing grooves 90 are formed in an outer surface of a cylindrical portion 86 of the receptacle connector 80 to be located in opposed relation to each other. Correspondingly, a pair of protrusions 36 are formed on an inner peripheral surface of an end of a joining member 18 of the plug connector 10 to be located in opposed relation to each other. The cylindrical portion 86 is formed to protrude toward a connector member 12 while surrounding a periphery of an LC adapter (adapter member) 81 of the receptacle connector 80. In an operation of fixing the plug connector 10 to the receptacle connector 80 by the bayonet connection, the protrusions 36 of the joining member 18 are pushed into and along the corresponding ones of the fixing grooves 90 of the cylindrical portion 86 in the arrowed direction "c1" in FIG. 1, and then the joining member 18 is rotated in the direction "d" in FIG. 1 along an outer surface of the cylindrical portion 86 to allow the protrusions 36 of the joining member 18 to be put into respective recesses 98 of the cylindrical portion 86.

The LC adapter 81 is provided with four fitting spaces 84. Each of the fitting spaces 84 is adapted to allow the connector member 12 of the plug connector 10 and a connector member of the receptacle connector 80 formed in the same configuration as that of the connector member 12 to be fittingly inserted thereinto from opposite sides in such a manner that they are butted against each other. Specifically, a target ferrule (not shown) supported by a connector member (not shown) of the receptacle connector 80 is disposed in a region of the fitting space 84 on the side of the receptacle connector 80, and then the connector member 12 of the plug connector 10 is fitted into a region of the fitting space 84 on the side of the plug connector 10, so that a ferrule 23 supported by the connector member 12 of the plug connector 10 can be butted against the target ferrule through a connection sleeve 91 provided in the LC adapter 81, to establish an optical connection. An optical fiber 22 is fixed to an end face of the ferrule 23, while exposing a fiber core thereof. The optical fiber 22 is, for example, led out from a jacket 29 of a cable 28 covering it together with a tension member (rigid cord member) 21, to extend inside the connector member 12.

The plug connector 10 primarily comprises a cord tube (housing body) 14 formed in a cylindrical-shaped body, a plurality of components arranged along the arrowed direction "f" in FIG. 2 and attached to the cord tube 14, such as a rubber hood 11, the connector member 12, an LC knob 62, a scroll wave ring 24 and a holding member 13, and a plurality of components arranged along the arrowed direction "g" in FIG. 2 and attached to the cord tube 14, such as the joining member 18, a fastener 17, a cord clamp 16 and a gasket 15. Each of the rubber hood 11, the gasket 15, the cord clamp 16 and the fastener 17 is formed in a generally cylindrical shape in conformity to the cord tube 14.

Figure 11:
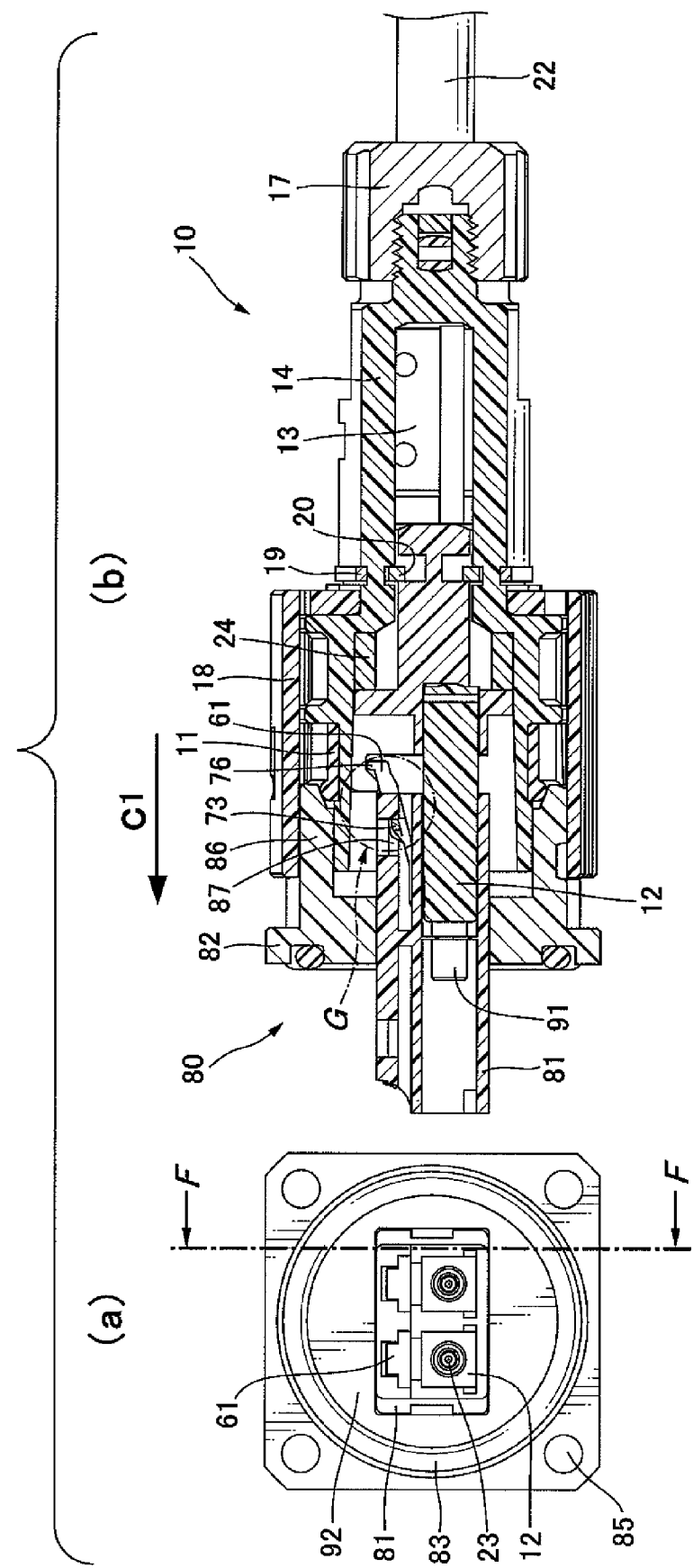
FIGS. 11(a) and 11(b) are diagrams showing the sequence of operation for connecting the plug connector and the receptacle connector.

In this embodiment, the connector member 12 is shown as a type including two connector members 12a, 12b each having the same configuration, by way of example. Alternatively, the number of connector members may be only one, or may be three or more. Each of the connector members 12a, 12b has the same configuration as that of a conventional commercially-available LC connector. This means that the present invention can be widely used in the conventional LC connector. The connector segment 12 (12a, 12b) has a cantilever beam portion (lock operation portion) 61 (61a, 61b) formed to extend rearwardly and obliquely upwardly. The cantilever beam portion 61 (61a, 61b) has a lock protrusion 73 (73a, 73b) formed on a lateral surface thereof. The lock protrusion 73 (73a, 73b) is adapted, when the connector member is fitted into the LC adapter 81, to be latched by a complementary shaped portion of the LC adapter 81 (a corresponding one of two concave-shaped lock portions provided in the LC adapter 81 (indicated by the reference numeral 87 in FIG. 11)), to allow the connector member 12 to be locked. This makes it possible to maintain butting between the ferrule 23 and the target ferrule.

As is well known, the lock by the cantilever beam portion 61 is automatically achieved by allowing the connector member 12 to be moved closer to the LC adapter 81, without a particular operation. More specifically, along with an operation of inserting the cantilever beam portion 61 (61a, 61b) into the fitting or receiving space 84 (84a, 84b) (see FIG. 3) of the LC adapter 81, The cantilever beam portion 61 (61a, 61b) is automatically displaced downwardly through a collision with the LC adapter 81. Then, after the lock protrusion 73 (73a, 73b) is received in the corresponding lock portion 87, the cantilever beam portion 61 (61a, 61b) is automatically returned upwardly to automatically lock the connector member 12. Differently, in an operation of pulling the connector member 12 away from the LC adapter 81, it is necessary to pulling the connector member 12 out of the LC adapter 81, while displacing the cantilever beam portion 61 (61a, 61b) downwardly by an external operation to release the locked state between the LC adapter 12 and the lock protrusion 73 (73a, 73b) of the connector member 12. Typically, the downward displacement of the cantilever beam portion 61 (61a, 61b) is performed through a manual operation by a user. In this embodiment, the LC knob (unlocking means) 62 is provided in such a manner as to be automatically operated in conjunction with movement of other members to perform the downward displacement, as described in detail later. Thus, the plug connector 10 in this embodiment can be connected to the receptacle connector 80 and released from the connection with the receptacle connector 80, through a single-step operation.

The connector member 12 (12a, 12b) is coupled to the LC knob 62 in such a manner as to be freely moved within a given distance along a butting direction of the ferrule and the target ferrule (a fitting direction of the connector member 12 and the LC adapter 81). More specifically, in order to couple the connector member 12 to the LC knob 62 in a freely movable manner, a certain level of play is provided between the gasket 15 and the connector member 12. The LC knob 62 generally comprises a flange 65 provided on a front side thereof, and a tubular portion 75 provided on a rear side thereof. A rear surface of the flange 65 is in contact with the scroll wave ring 24 as an elastic member disposed between the LC knob 62 and the cord tube 14, so that the LC knob 62 is constantly biased frontwardly, i.e., in a direction causing the fitting between the connector member 12 and the LC adapter 81.

The flange 65 of the LC knob 62 is formed with a through-hole 69 communicated with an inside of the tubular portion 75. A rear end region 68 of the connector member 12 is inserted into and supported by the through-hole 69 and the tubular portion 75. The connector member 12 can be freely moved with respect to the LC knob 62 along the fitting direction of the connector member 12 and the LC adapter 81, while being inserted into and supported by the through-hole 69 and the tubular portion 75. However, a frontward movement (i.e., a movement toward the receptacle connector 80) of the connector member 12 is restricted through a collision between a plate-shaped collision spacer 64 provided at a rear end of the connector member 12 and a rear wall 74 of the LC knob 62 defining a rear opening of the through-hole 69. Further, a rearward movement (i.e., a movement toward a side opposite to the receptacle connector 80) of the connector member 12 is restricted through a collision between a protrusion 66 provided on a lower region of an outer surface of the connector member 12 and a front wall 72 of the LC knob 62 defining a front opening of the through-hole 69. Thus, the connector member 12 is never pulled out of the LC knob 62. The collision spacer 64 can be attached to the connector member 12 in the arrowed direction "e", as shown in FIG. 2.

The LC knob 62 has a tab 67 provided on a front side of an upper portion of the flange 65. The tab 67 is formed to protrude frontwardly and have a front end region protruding downwardly, i.e., toward the cantilever beam portion 61, so that the tab 67 generally has a shape capable of wrapping around a free end of the cantilever beam portion 61. Thus, when the LC knob 62 is moved rearwardly with respect to the connector member 12, the cantilever beam portion 61 (61a, 61b) is pushed downwardly through a contact between the tab 67 and the free end 76 of the cantilever beam portion 61, so that the locked state between the connector member 12 and the LC adapter 81 is released. This means that the locked state between the connector member 12 and the LC adapter 81 can be released by moving the LC knob 62 rearwardly with respect to the connector member 12.

The cord tube 14 can be classified into a small-diameter portion 50, an intermediate-diameter portion 51, and a large-diameter portion 52, for convenience of explanation. The small-diameter portion 50 has the gasket 15, the cord clamp 16 and the fastener 17 which are attached thereto while allowing the cable 28 to penetrate therethrough. This makes it possible to achieve a more reliable waterproof structure. A rear end of the small-diameter portion 50 is formed to have an increased inner diameter. The gasket 15 is inserted into the increased-diameter portion, and the cord clamp 16 is attached to compress the gasket 15 having the cable 28 penetrating therethrough. Then, the fastener 17 is attached to compress an elastic portion 58 provided at a rear end of the cord clamp 16, to reduce a diameter of the elastic portion 58. Specifically, a rear end of the fastener 17 is formed as a tapered portion 57 having an inner diameter which gradually decreases toward a rear edge thereof, so that the elastic portion 58 is compressed by the tapered portion 57, to allow the cable 28 to be fixed. In order to facilitate positioning of the cord clamp 16 relative to the small-diameter portion 50, a positioning cutout (not shown) may be formed in an inner wall of the small radius portion 50, and correspondingly a positioning protrusion 56 may be formed on the cord clamp 16. In a state after all the above components are attached to the small-diameter portion 50, an outer surface of the small-diameter portion 50, and an outer surface of the elastic portion 58 provided at the rear end of the cord clamp 16 to protrude from the small-diameter portion 50, are fully covered by the fastener 17.

The intermediate-diameter portion 51 is formed and arranged to support the tubular portion 75 of the LC knob 62. The tubular portion 75 has an outer diameter approximately equal to an inner diameter of the intermediate-diameter portion 51. Thus, the cord tube 14 supports the LC knob 62 while allowing the LC knob 62 to be slidingly moved within a given distance along the butting direction of the ferrule 23 and the target ferrule (along the arrowed direction "c" in FIG. 2). Further, the plate-shaped holding member 13 is received in the intermediate-diameter portion 51. The holding member 13 has an outer diameter less than an inner diameter of the intermediate-diameter portion 51, so that the holding member 13 is fully inserted into the intermediate-diameter portion 51. The holding member 13 is provided with a slit 63 which allows an end of the tension member 21 to be inserted thereinto. The tension member 21 can be inserted into the slit 63, and fixed to the holding member 13 using a screw (not shown) provided to penetrate through a screw hole 26 formed therein. The tension member 21 is fixed to the holding member 13 in the above manner. Thus, for example, even if the tension member 21 is pulled along the butting direction and toward the side opposite to the receptacle connector 80, a rear surface 45 of the holding member 13 is brought into contact with an inner wall 47 of a rear end of the cord tube 14, so that a pulling force can be transmitted to the cord tube 14 to reduce a force to be applied to the optical fiber 22.

A rear plate 35 of the joining member 18 is positioned around a boundary between the intermediate-diameter portion 51 and the large-diameter portion 52, and then a C-shaped retainer member (spring washer) 19 is attached to an outer peripheral surface of a front end of the intermediate-diameter portion 51. The retainer member 19 is adapted to collide with the rear plate 35 of the joining member 18 supported by the intermediate-diameter portion 51, to prevent pull-out of the joining member 18 from the intermediate-diameter portion 51. The retaining member 19 is elastically fitted into a circular C-shaped concave portion 32 formed in the intermediate-diameter portion 51.

A C-shaped spring washer (coupling member) 20 is attached to an inner peripheral surface of the front end of the intermediate-diameter portion 51 at a position adjacent to an inner surface the retainer member 19. The spring washer 20 is elastically attached as with the retainer member 19. Specifically, the spring washer 20 is disposed to extend over a space 60 defined by an annular-shaped outer concave portion 30 formed in an outer wall 38 of the tubular portion 75 of the LC knob 62 and an annular-shaped inner concave portion 33 formed in an inner wall 39 of the cord tube 14, to couple the LC knob 62 and the cord tube 14 together. The annular-shaped outer concave portion 30 and the annular-shaped inner concave portion 33 define two recesses communicated in a direction intersecting with the butting direction (in the arrowed direction "h" in FIG. 4). In particular, the annular-shaped outer concave portion 30 defines a recess having a length greater than that of the spring washer 20 in the butting direction (the arrowed direction "c"). The recess of the annular-shaped outer concave portion 30 having such a length allows the LC knob 62 to be slidingly moved within a given distance with respect to the cord tube 14. A part of a rear end of the intermediate-diameter portion 51 is formed as a pair of flat portions 53 located in opposed relation to each other to perform a tightening operation using a tool such as a spanner. The fastener 17 is also formed with a pair of flat portions.

The large-diameter portion 52 has a tubular portion 25 formed to protrude toward the cylindrical portion 86 of the receptacle connector 80 along the butting direction. The connector member 12, and the flange 65 of the LC knob 62 coupled to the connector member 12, can be slidingly moved inside the tubular portion 25 within a given distance along the butting direction. In an operation of fixing the plug connector 10 to the receptacle connector 80, the tubular portion 25 can be brought into contact with an inner peripheral surface 97 of the cylindrical portion 86 to form an overlapping region 88 with the cylindrical portion 86 along the butting direction. The formation of the overlapping region 88 makes it possible to more effectively keep out water. Further, the generally cylindrical-shaped joining member 18 after penetrating the intermediate-diameter portion 51 is freely fitted onto the large-diameter portion 52. The joining member 18 is a generally cylindrical-shaped member which protrudes toward the receptacle connector 80 along the butting direction of the ferrule 23 and the target ferrule and covers an outer periphery of the large-diameter portion 52. In the operation of fixing the plug connector 10 to the receptacle connector 80, the joining member 18 is connected to the cylindrical portion 86 of the receptacle connector 80 by the bayonet connection, in the aforementioned manner. In the operation of fixing the plug connector 10 to the receptacle connector 80, the cylindrical portion 86 of the receptacle connector 80 is disposed while being inserted into a gap 99 defined between the joining member 18 and the tubular portion 25 of the plug connector 10. The joining member 18 can cover an outer peripheral surface 96 of the cylindrical portion 86 and form an overlapping region 87 with the cylindrical portion 86 along the butting direction, as with the tubular portion 25. This makes it possible to reliably keep out water. The rubber hood 11 provided in the gap 99 defined between the joining member and the large-diameter portion 52 can also enhance the waterproof effect. The rubber hood 11 is positioned in such a manner that it is received in an annular-shaped positioning recess 54 formed in the tubular portion 25, and a rear surface thereof is butted against a flange 27 of the tubular portion 25 constituting a part of the large-diameter portion 52. In an operation of connecting the plug connector 10 to the receptacle connector 80, a raised portion 41 formed at a front end of the rubber hood 11 is brought into close contact with a thin-walled region 89 of the cylindrical portion 86, so that the gap can be more reliably closed.

With reference to FIGS. 5(a) to 20, a function of the waterproof device 1 will be described. FIGS. 5(a) to 12 show a sequence of operation for connecting the plug connector 10 to the receptacle connector 80, i.e., a sequence of operation for fitting the connector member 12 into the LC adapter 81. FIGS. 13(a) to 20 show a sequence of operation for releasing the connection between the plug connector 10 and the receptacle connector 80, i.e., a sequence of operation for pulling the connector member 12 away from the LC adapter 81.

Figure 5:
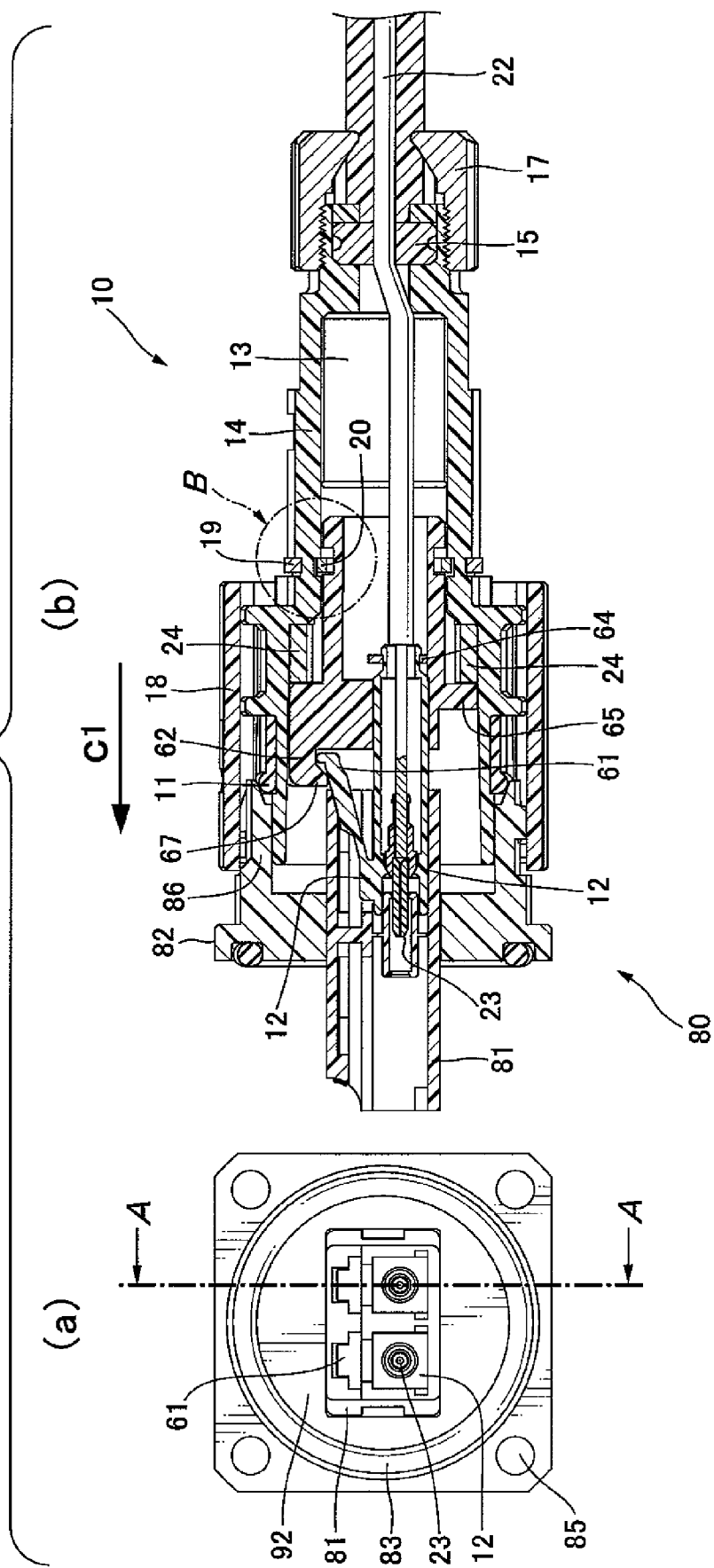
FIGS. 5(a) and 5(b) are diagrams showing a sequence of operation for connecting the plug connector and the receptacle connector.
Figure 6:
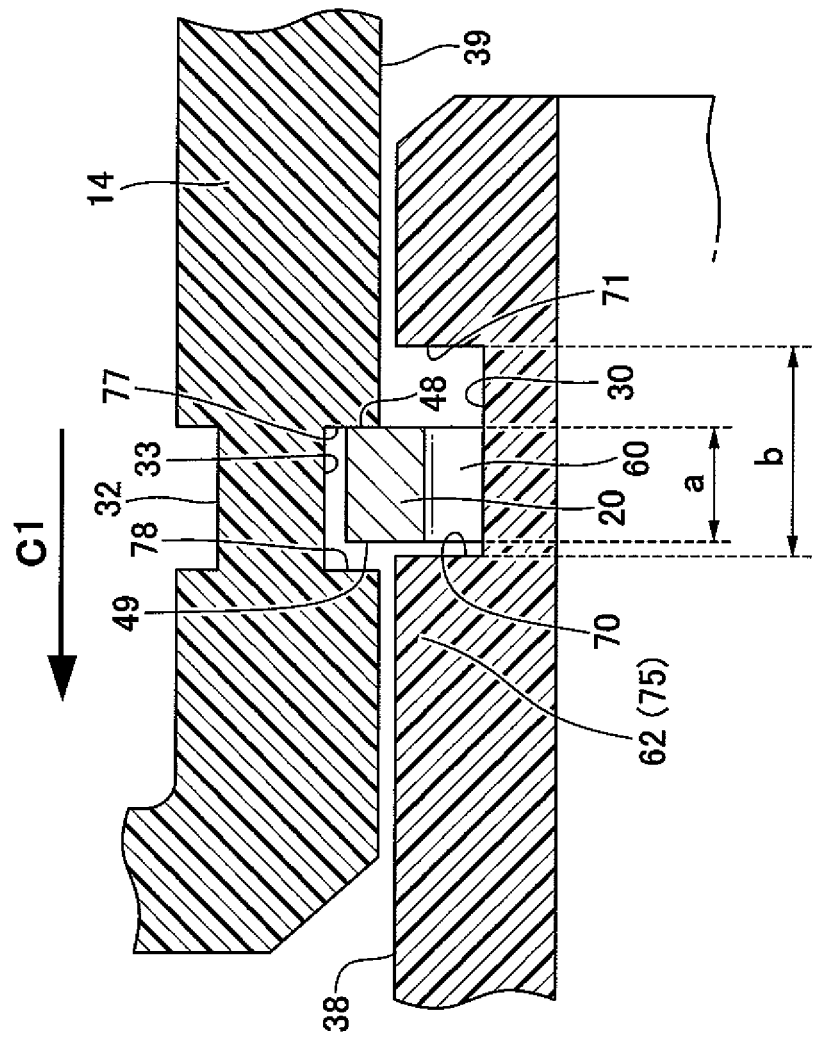
FIG. 6 is a fragmentary enlarged view of a region B in FIG. 5(b).
Figure 7:
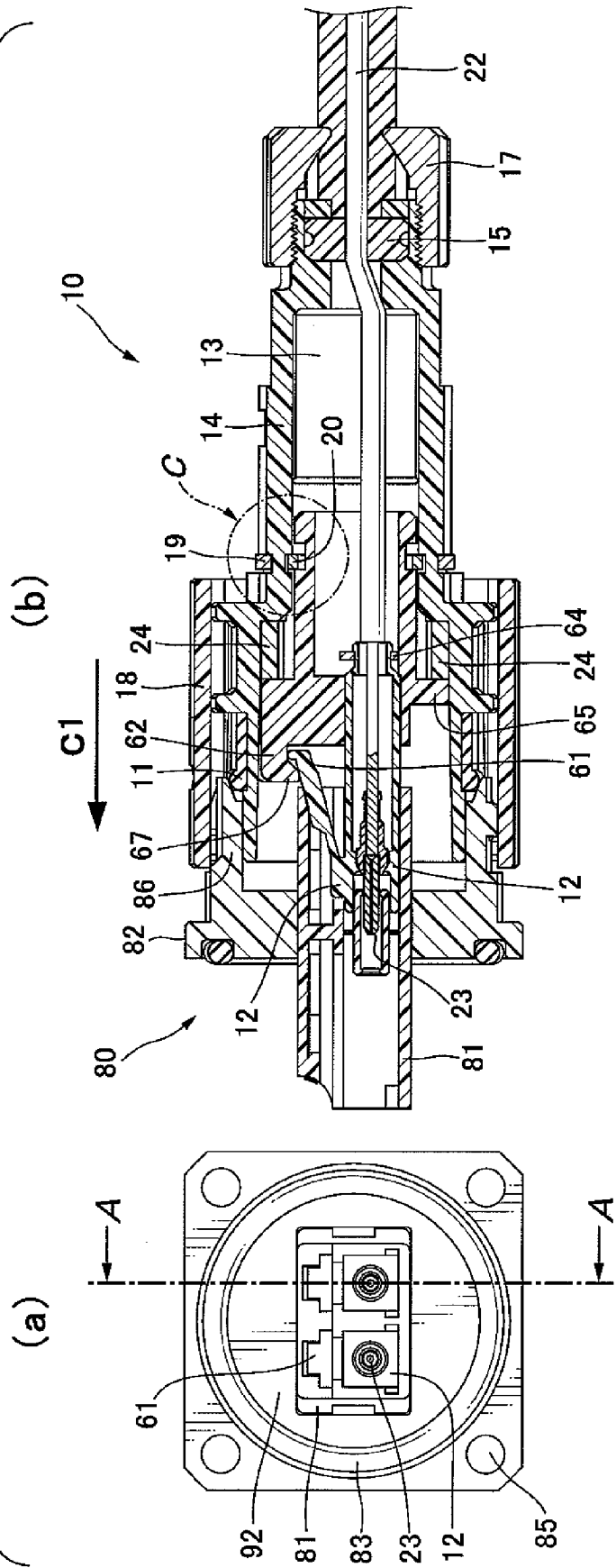
FIGS. 7(a) and 7(b) are diagrams showing the sequence of operation for connecting the plug connector and the receptacle connector.
Figure 8:
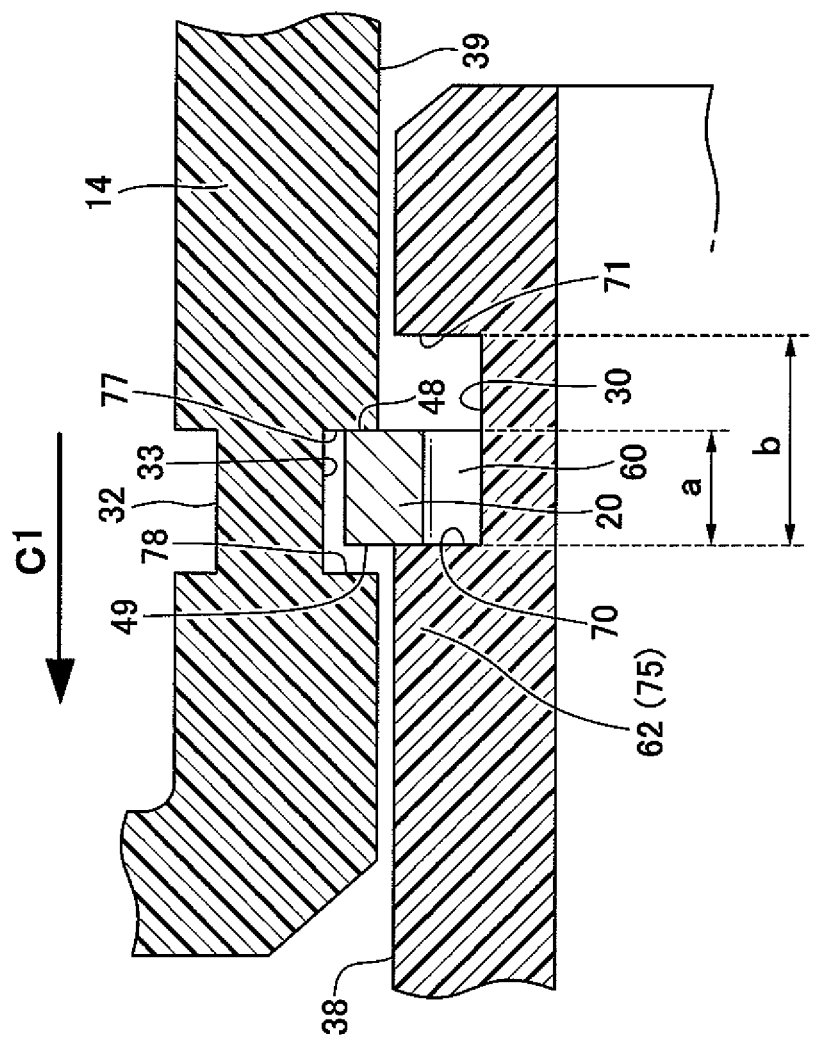
FIG. 8 is a fragmentary enlarged view of a region C in FIG. 7(b).
Figure 9:
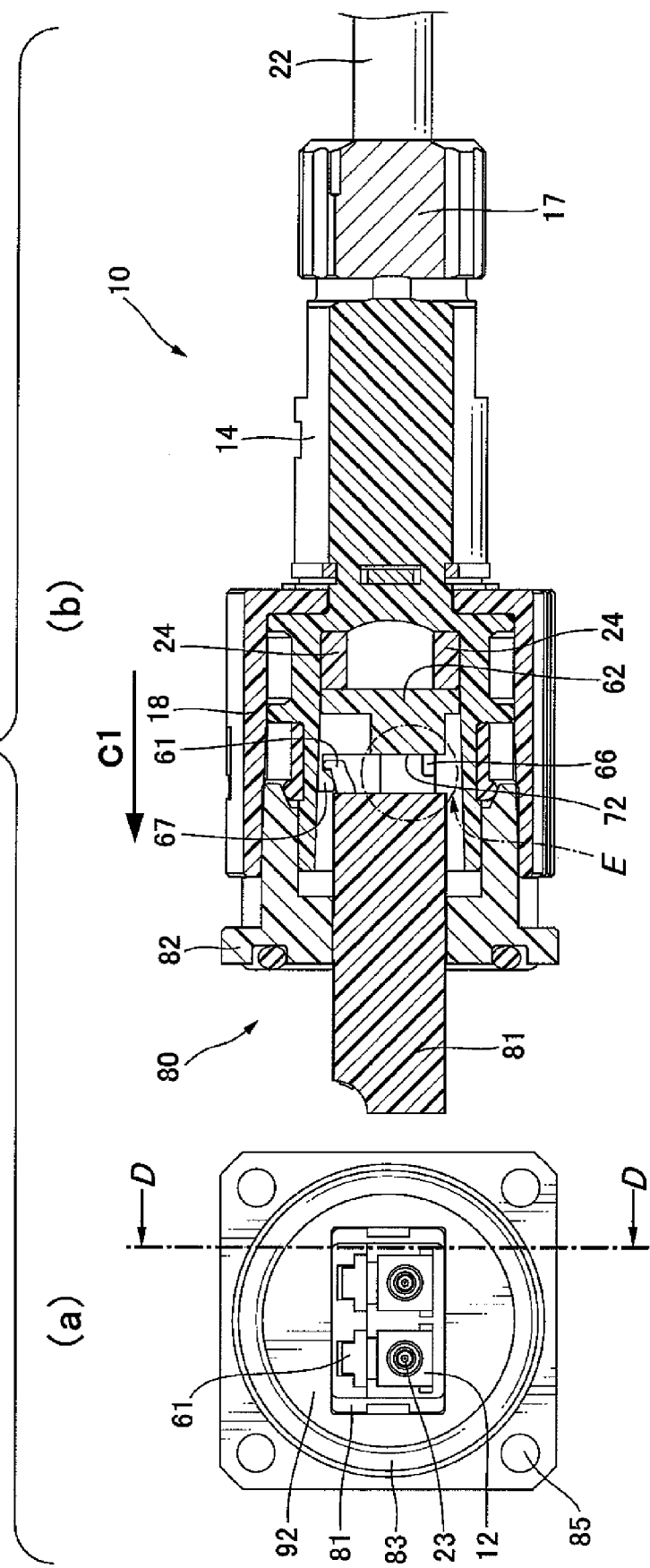
FIGS. 9(a) and 9(b) are diagrams showing the sequence of operation for connecting the plug connector and the receptacle connector.
Figure 10:
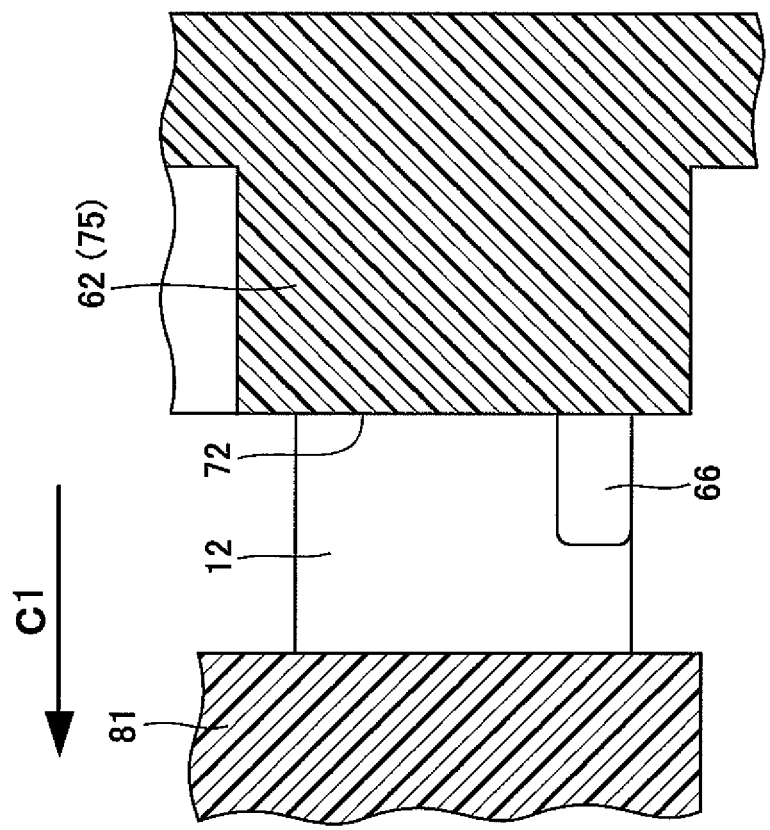
FIG. 10 is a fragmentary enlarged view of a region E in FIG. 9(b).
Figure 12:
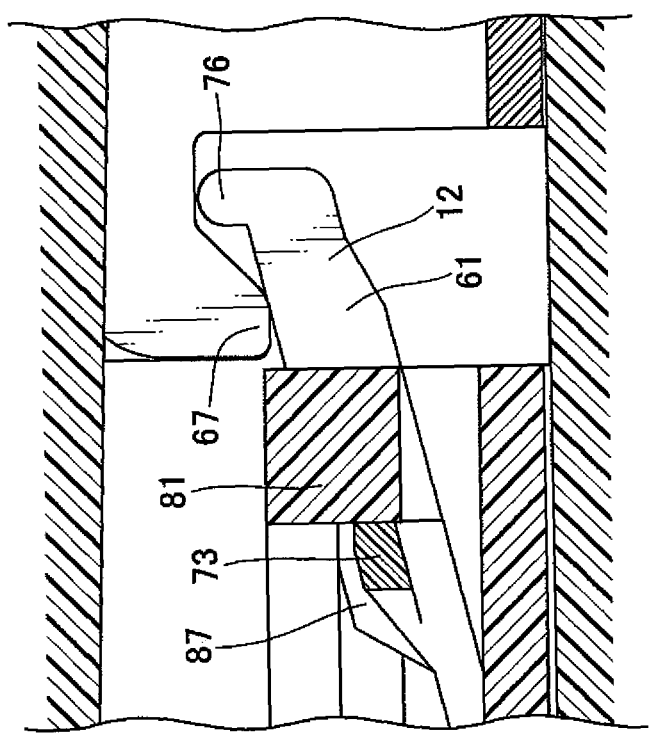
FIG. 12 is a fragmentary enlarged view of a region G in FIG. 11(b).
Figure 13:
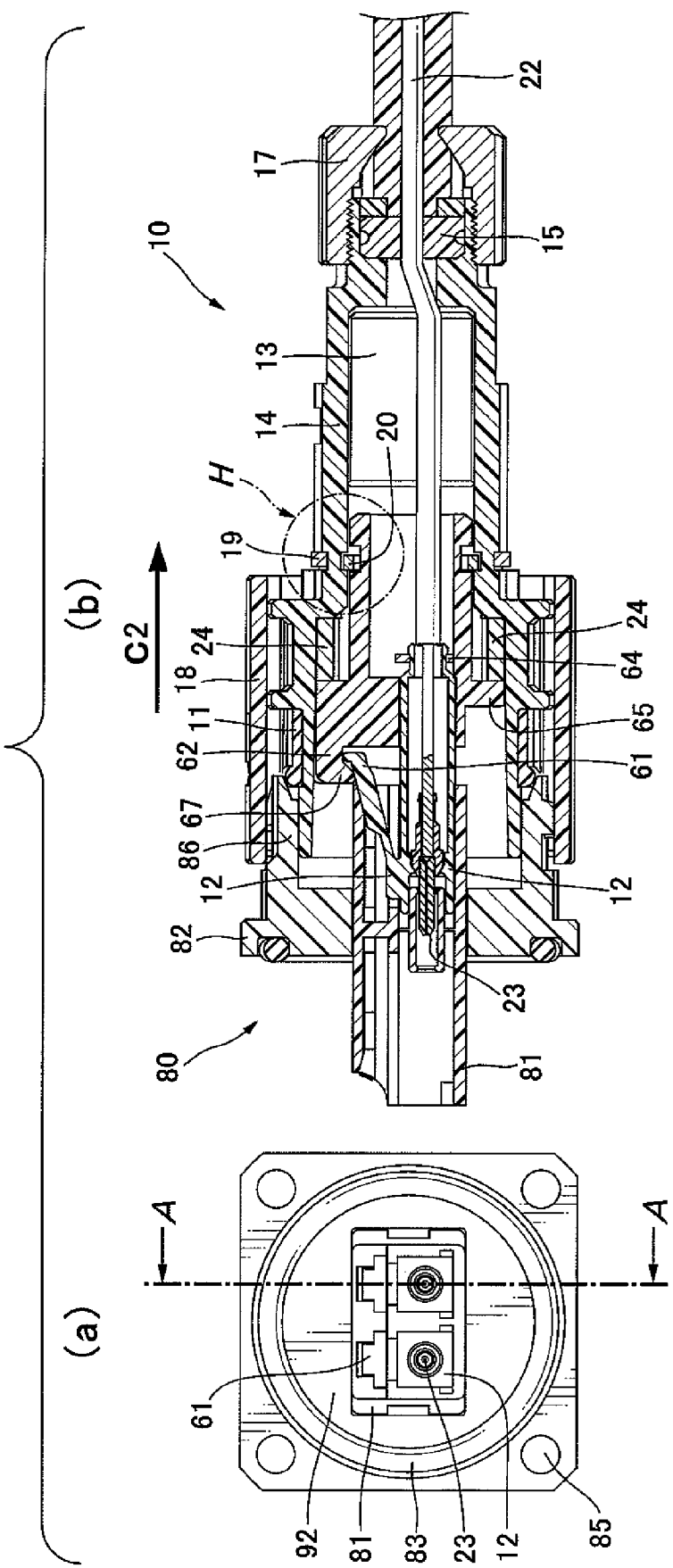
FIGS. 13(a) and 13(b) are diagrams showing a sequence of operation for pulling the plug connector away from the receptacle connector.
Figure 14:
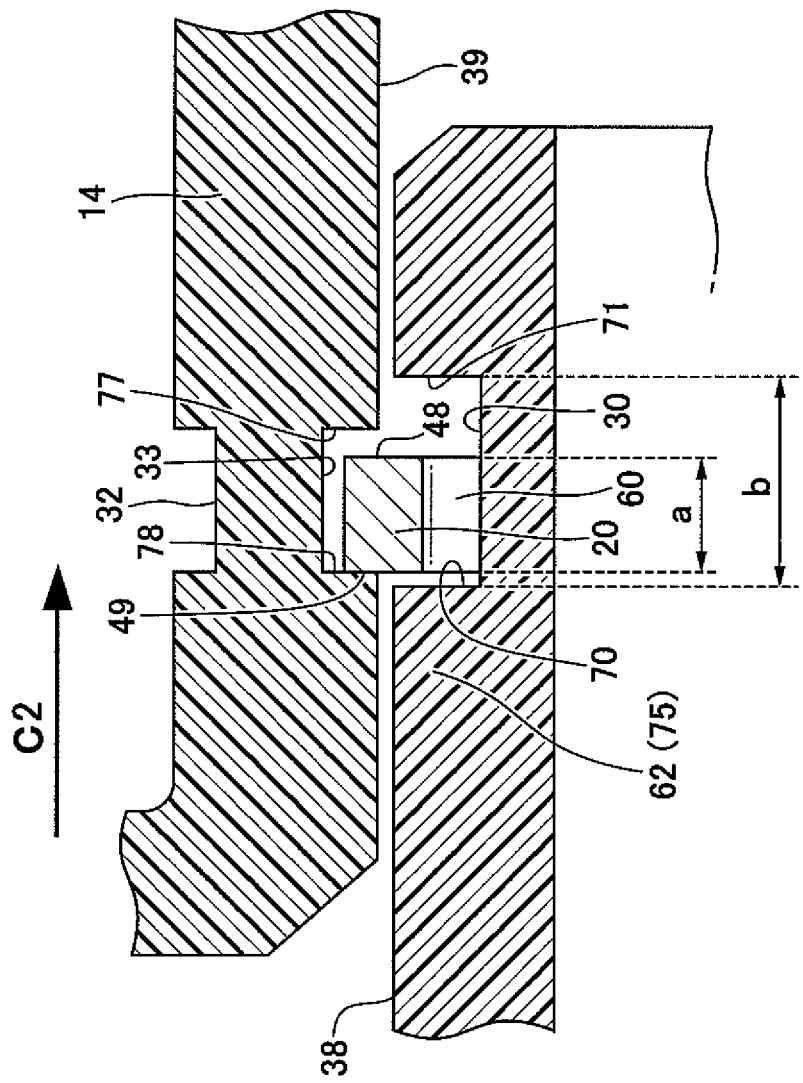
FIG. 14 is a fragmentary enlarged view of a region H in FIG. 13(b).
Figure 15:
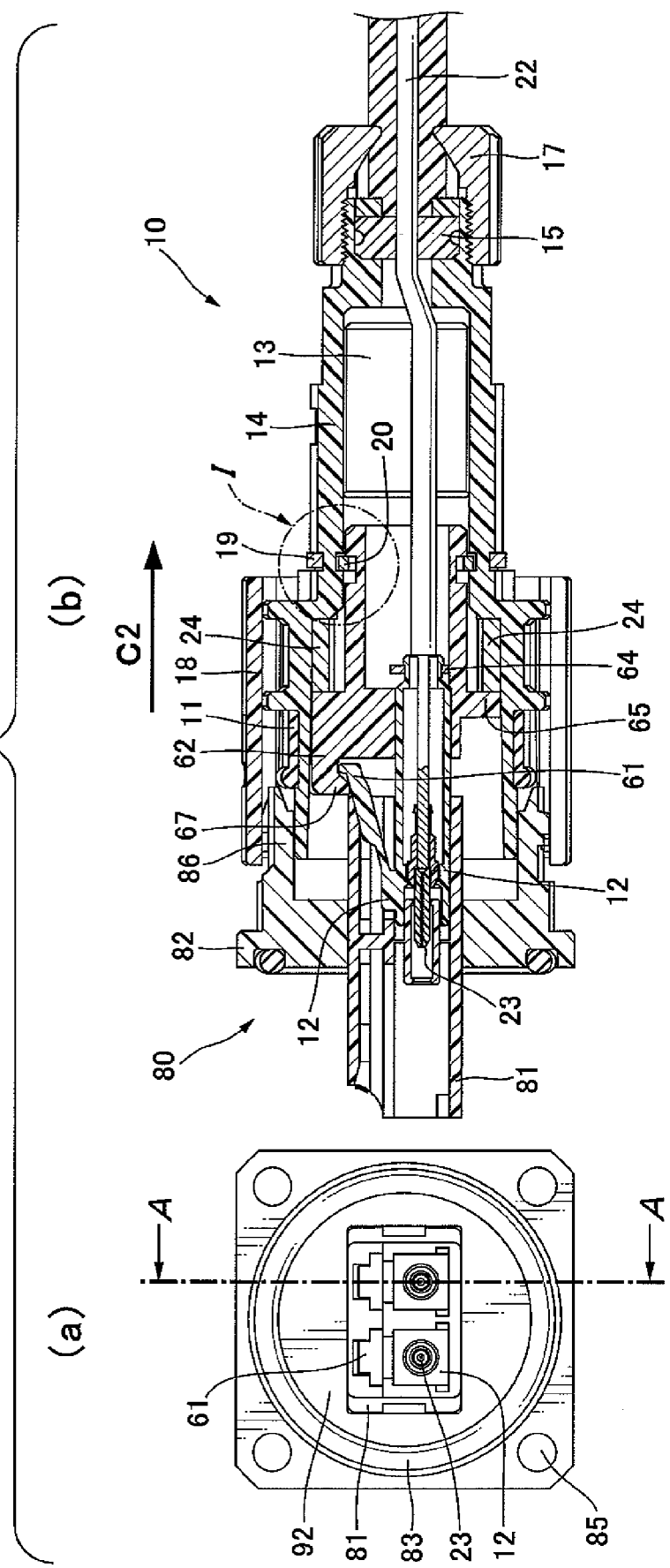
FIGS. 15(a) and 15(b) are diagrams showing the sequence of operation for pulling the plug connector away from the receptacle connector.
Figure 16:
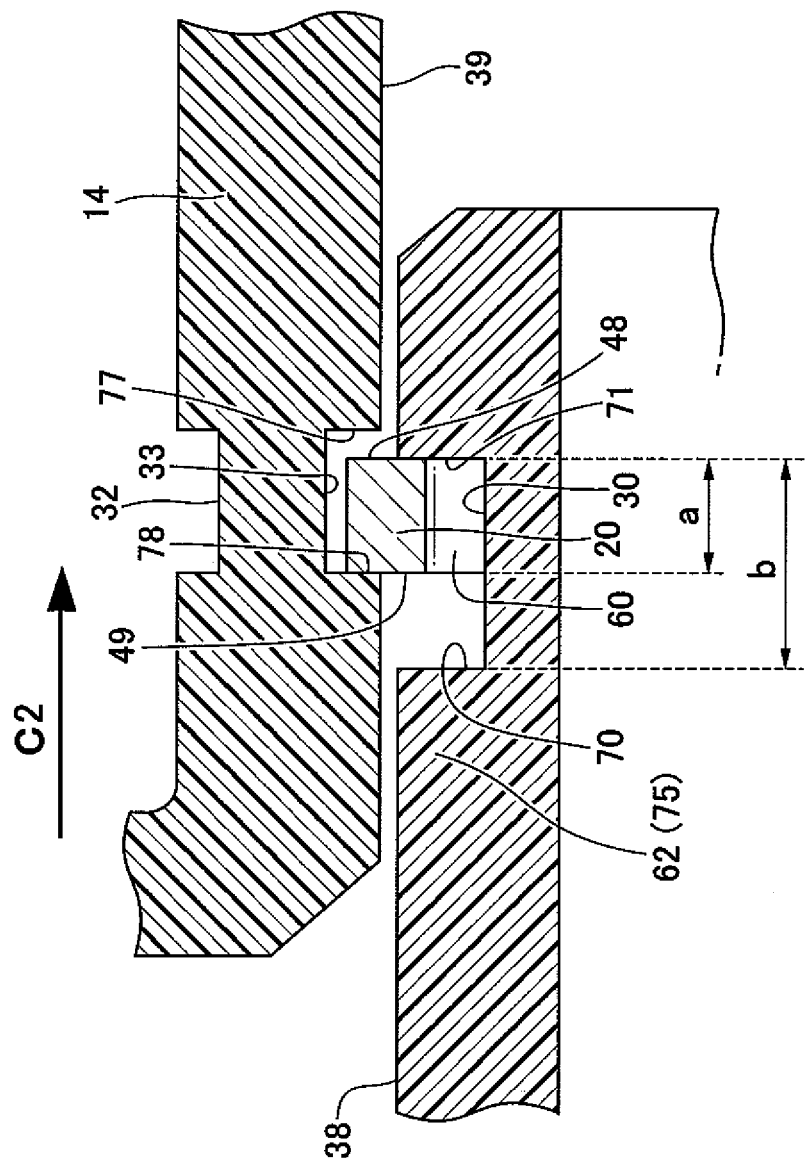
FIG. 16 is a fragmentary enlarged view of a region I in FIG. 15(b).
Figure 17:
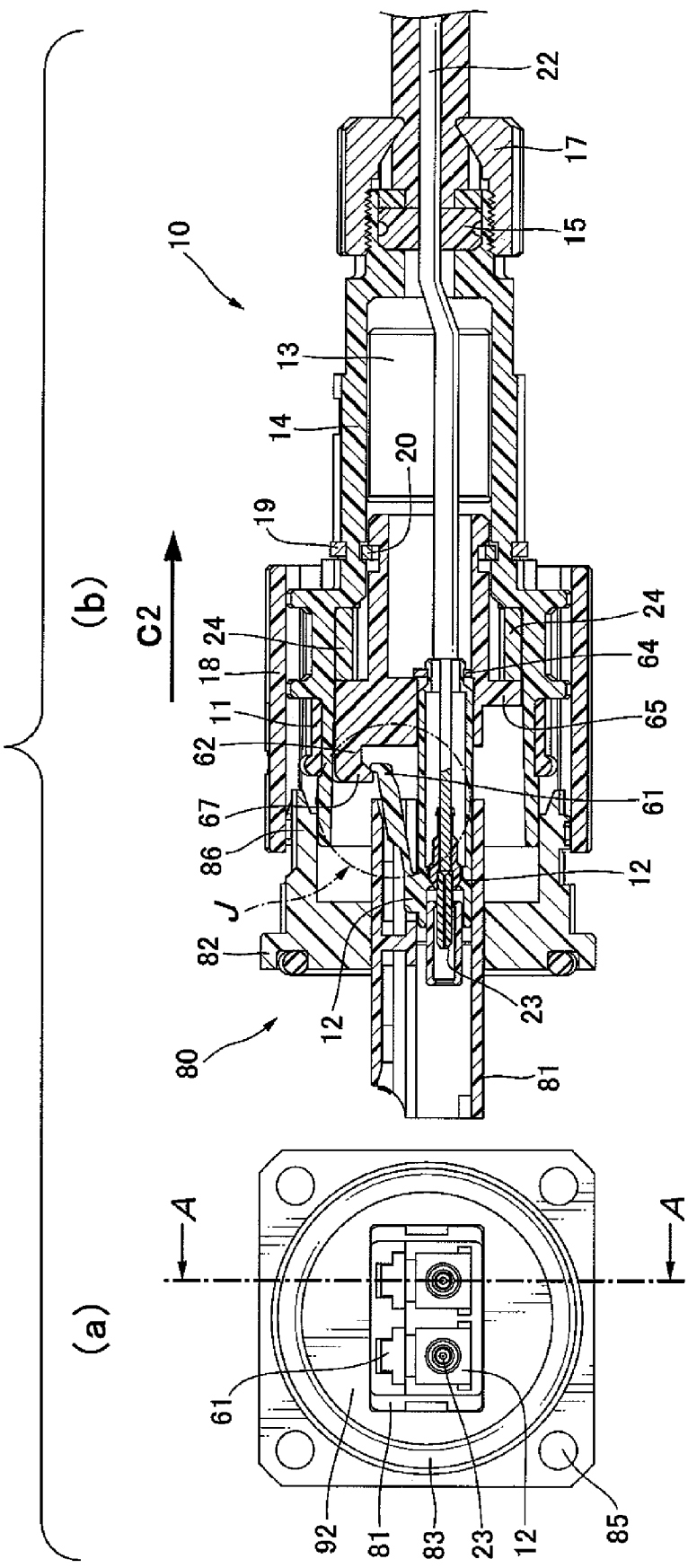
FIGS. 17(a) and 17(b) are diagrams showing the sequence of operation for pulling the plug connector away from the receptacle connector.
Figure 18:
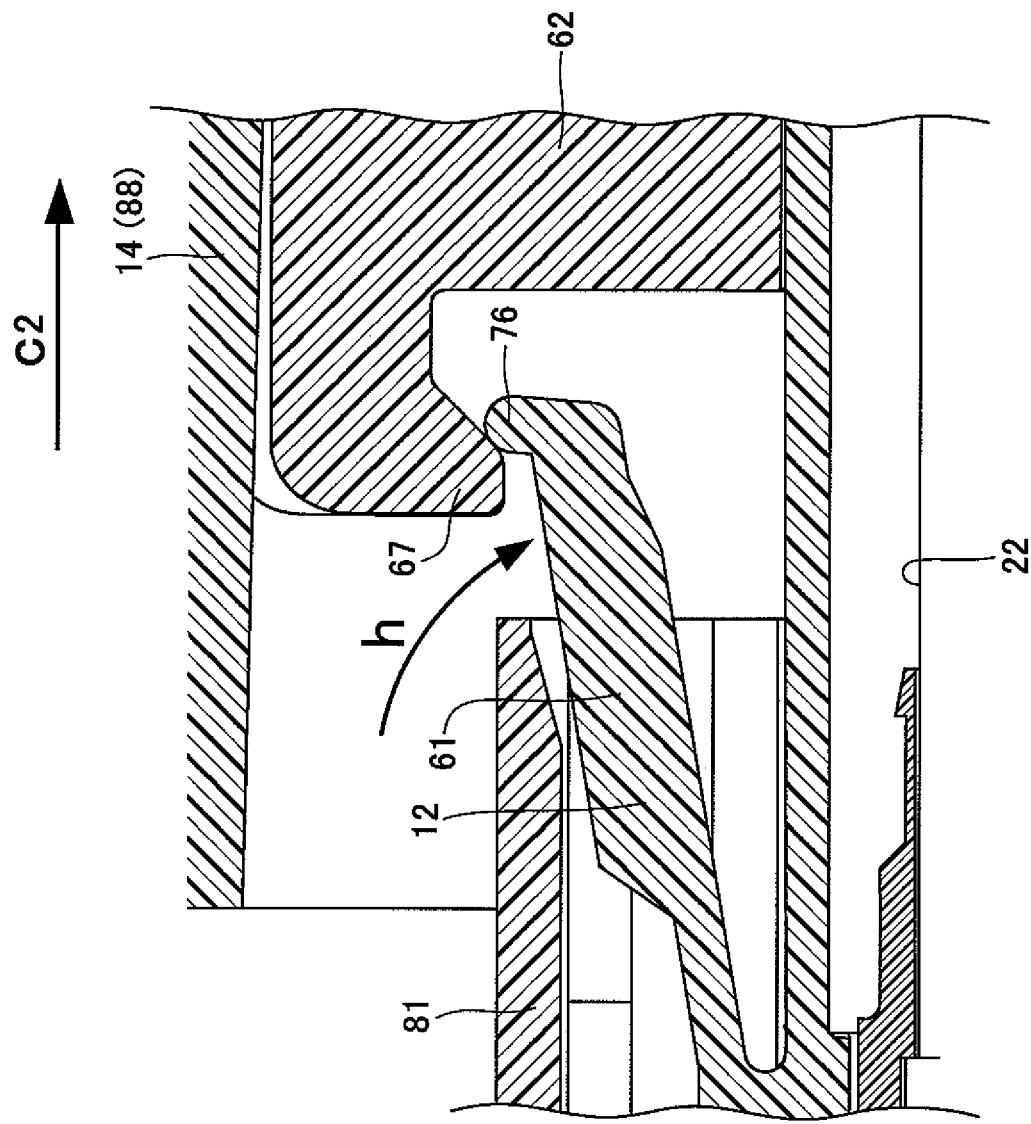
FIG. 18 is a fragmentary enlarged view of a region J in FIG. 17(b).
Figure 19:
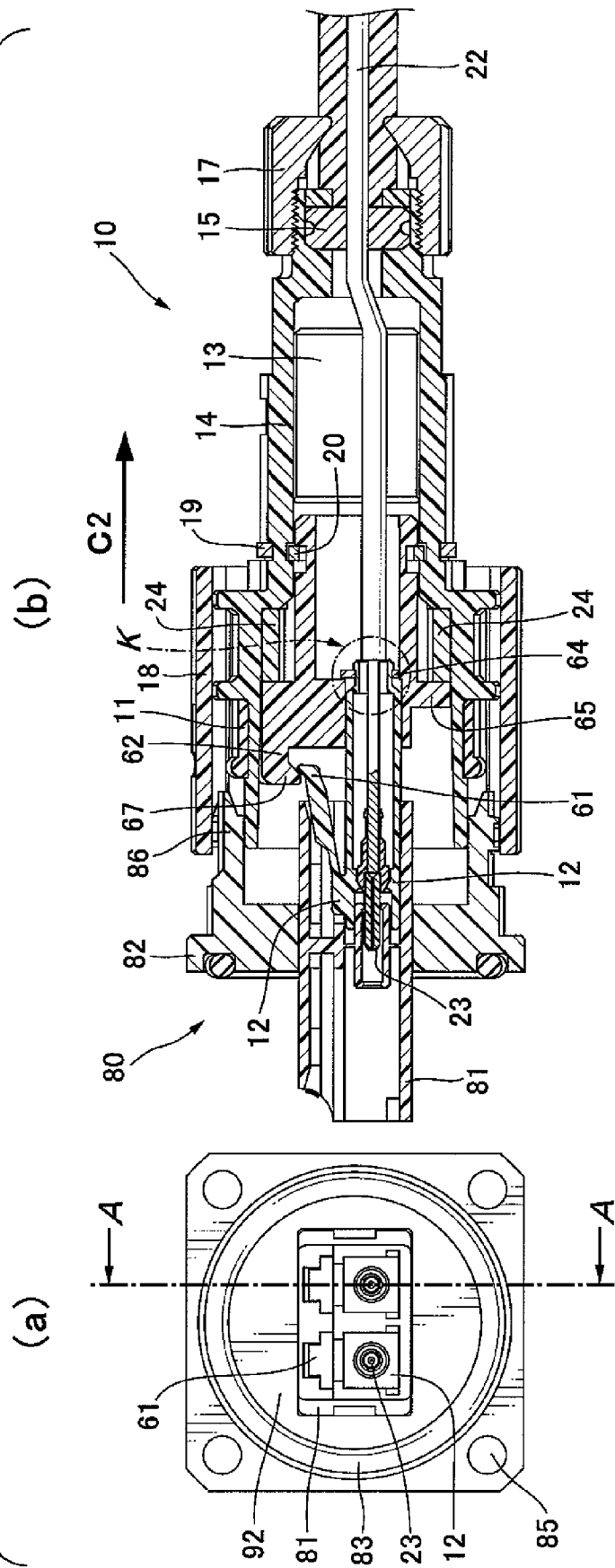
FIGS. 19(a) and 19(b) are diagrams showing the sequence of operation for pulling the plug connector away from the receptacle connector.
Figure 20:
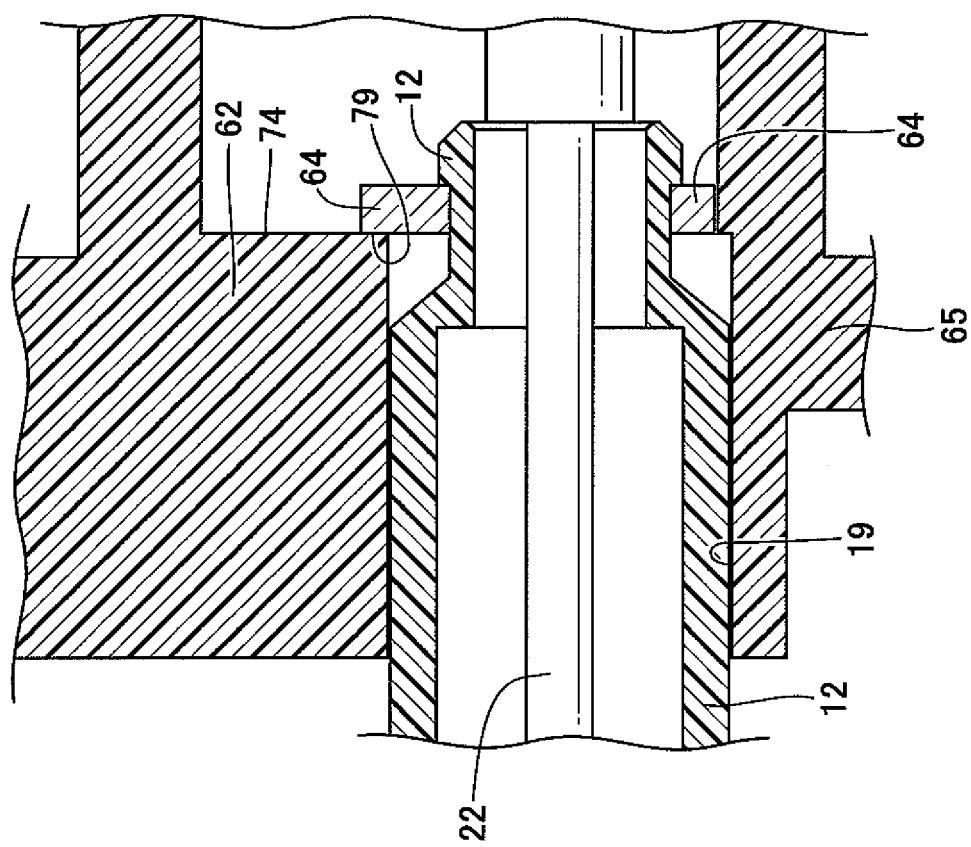
FIG. 20 is a fragmentary enlarged view of a region K in FIG. 19(b).
Figure 21:
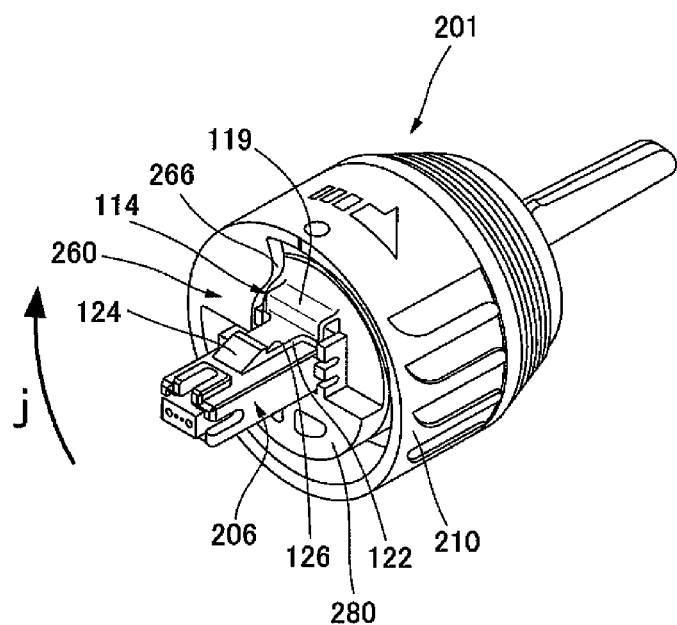
FIG. 21 is a front perspective view showing a conventional waterproof connector.
Figure 22:
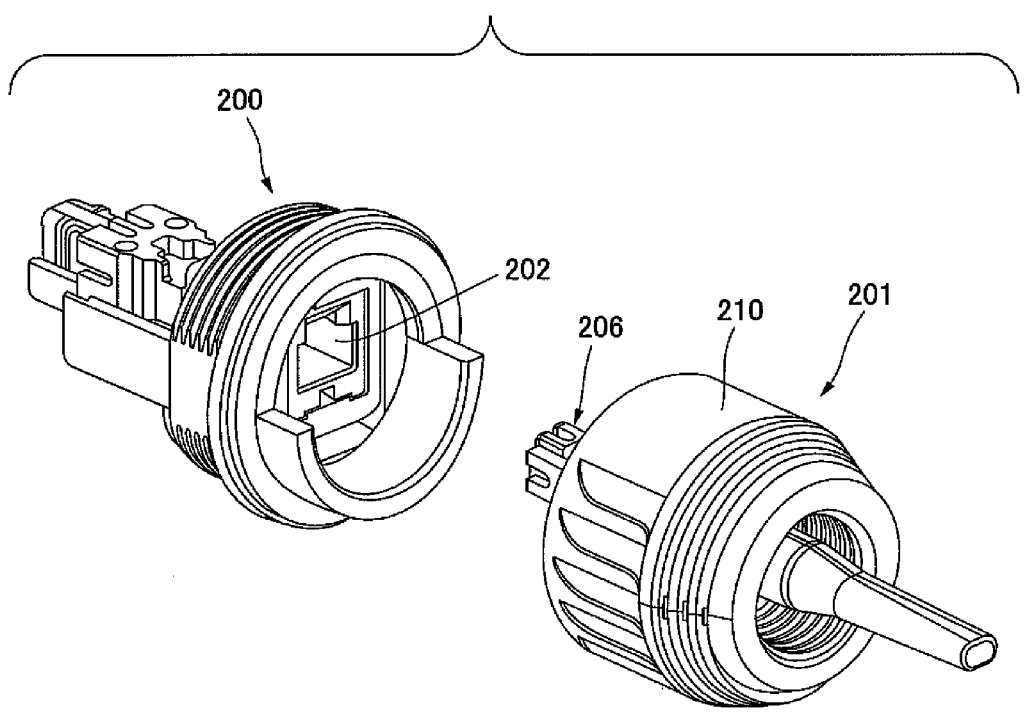
FIG. 22 is a perspective view showing the waterproof connector illustrated in FIG. 21, together with a target connector, in a state before connection therebetween.

In FIGS. 5(a) and 5(b) to FIGS. 19(a) to 19(b), the figure suffixed with (a) indicates a section line in the vertical sectional view of the figure suffixed with (b), and shows a state during the operation of connecting the plug connector 10 to the receptacle connector 80 (fitting the connector member 12 into the LC adapter 81, for convenience of illustration. In the vertical sectional views taken along the section line located at the same position in the figure suffixed with (a), each component is defined by a common reference numeral or code. For example, a position of the line A-A indicated in FIG. 5(a) is the same as that of the line A-A indicated in FIG. 7(a), but it is different from that of the line D-D indicated in FIG. 9(a). FIGS. 6, 8, 10, 12, 14, 16, 18 and 20 are fragmentary enlarged views of respective regions shown in FIGS. 5(b), 7(b), 9(b), 11(b), 13(b) 15(b), 17(b) and 19(b). More specifically, FIG. 6 is a fragmentary enlarged view of a region B in FIG. 5(b), and FIG. 8 is a fragmentary enlarged view of a region C in FIG. 7(b). FIG. 10 is a fragmentary enlarged view of a region E in FIG. 9(b), and FIG. 12 is a fragmentary enlarged view of a region G in FIG. 11(b). FIG. 14 is a fragmentary enlarged view of a region H in FIG. 13(b), and FIG. 16 is a fragmentary enlarged view of a region I in FIG. 15(b), and FIG. 18 is a fragmentary enlarged view of a region J in FIG. 17(b). FIG. 20 is a fragmentary enlarged view of a region K in FIG. 19(b)

With reference to FIGS. 5(a) to 12, a movement during operation of connecting the plug connector 10 to the receptacle connector 80 will be described below.

1) As shown in FIGS. 5(a), 5(b) and 6, the cord tube 14 is moved toward the receptacle connector 80 (the arrowed direction "c1") along the fitting direction of the connector member 12 and the LC adapter 81, to allow the joining member 18 supported by the cord tube 14 to be moved closer to the cylindrical portion 86, and allow a rear surface 77 of an inner wall of the concave portion 33 of the cord tube 14 to be brought into contact with a rear surface of the spring washer 20, so that the spring washer 20 is integrally moved together with the cord tube 14.

2) As shown in FIGS. 7(a), 7(b) and 8, the cord tube 14 is further moved toward the receptacle connector 80, to allow a front surface 49 of the spring washer 20 to be brought into contact with a front surface 70 of an inner wall of the concave portion 30 of the LC knob 62, so that the LC knob 62 supported by the cord tube 14 is moved toward the connector member 12 through the spring washer 20.

3) As shown in FIGS. 9(a), 9(b) and 10, the cord tube 14 is further moved toward the receptacle connector 80, to allow the protrusion 66 provided on the outer surface of the connector member 12 to be brought into collision with the front wall 72 of the LC knob 62 defining the front opening of the through-hole 69, so that the connector member 12 supported by the LC knob 62 is moved closer to the LC adapter 81 through the collision.

4) As shown in FIGS. 11(a), 11(b) and 12, the cord tube 14 is further moved toward the receptacle connector 80, to allow the cantilever beam portion 61 of the connector member 12 to be engaged with the corresponding lock portion 87 of the LC adapter 81 through elastic displacement thereof, so that the connector member 12 is fitted into the LC adapter 81 and locked thereto.

5) Finally, the joining member 18 is rotated in a clockwise direction (the arrowed direction "d") and fixed to the cylindrical portion 86 in a bayonet manner.

With reference to FIGS. 13(a) to 20, a movement during the operation of releasing the connection between the plug connector 10 and the receptacle connector 80 will be described below.

1) The joining member 18 is rotated in a counterclockwise direction (the arrowed direction "d") to release the fixing of the cylindrical portion 86.

2) Then, as shown in FIGS. 13(a), 13(b) and 14, the cord tube 14 is moved toward the side opposite to the receptacle connector 80 (the arrowed direction "c2") along the fitting direction of the connector member 12 and the LC adapter 81, to allow the joining member 18 supported by the cord tube 14 to be moved away from the cylindrical portion 86, and allow the a front surface 78 of the inner wall of the concave portion 33 of the cord tube 14 to be brought into contact with the front surface 49 of the spring washer 20, so that the spring washer 20 is integrally moved together with the cord tube 14.

3) As shown in FIGS. 15(a), 15(b) and 16, the cord tube 14 is further moved toward the side opposite to the receptacle connector 80, to allow a rear surface 48 of the spring washer 20 to be brought into contact with a rear surface 71 of the inner wall of the concave portion 30 of the LC knob 62, so that the LC knob 62 supported by the cord tube 14 is moved away from the connector member 12.

4) Thus, as shown in FIGS. 17(a), 17(b) and 18, the tab 67 of the LC knob 62 is brought into contact with the free end 76 of the cantilever beam portion 61, so that the cantilever beam portion 61 is pushed downwardly (in the arrowed direction "h") through the contact, and the locked state between the LC adapter 81 and the connector member 12 is released.

5) As shown in FIGS. 19(a), 19(b) and 20, the cord tube 14 is further moved toward the side opposite to the receptacle connector 80, to allow the collision member 64 provided at the rear end of the connector member 12 to be brought into collision with the rear wall of the LC knob 62 defining the rear opening of the through-hole 69, so that the connector member 12 supported by the LC knob 62 is moved away from the LC adapter 81 through the collision, and the fitting between the connector member 12 and the LC adapter 81 is released.

In the waterproof device according to this embodiment, in the operation of connecting the plug connector 10 to the receptacle connector 80, the connector member 12 can be fitted into the LC adapter 81, and the joining member 18 can be connected to the cylindrical portion 87 (or fixed to the cylindrical portion 87 by a bayonet connection), through a single-step operation of moving the cord tube 14 with respect to the connector member 12. Further, in the operation of releasing the connection between the plug connector 10 and the receptacle connector 80, the bayonet connection between the joining member 18 and the cylindrical portion 86 can be released, and the fitting between the connector member 12 and the LC adapter 18 can be released, through a single-step operation of moving the cord tube 14 with respect to the connector member 12. As above, in the above embodiment, although it is necessary to rotate the joining member in order to release the bayonet lock, the plug connector 10 can be connected to the receptacle connector 80, and the connection therebetween can be released, through a single-step operation. Particularly, the unlocking of the connector member 12 provided in the plug connector 10 can be achieved only by a "pull-out operation". Thus, it can be said that the waterproof device according to the above embodiment has excellent operating efficiency. In addition, the fitting between the connector member 12 and the LC adapter 81 can be released in a usual manner, although it is performed using the LC knob 62. This also provides an advantage of being able to facilitate checking the release of the locked state.

The present invention can be applied to not only a waterproof connector but also various other types of connectors.

What is claimed is:
1. A waterproof connector comprising:
   a connector member supporting a ferrule to be butted against a target ferrule disposed in a target connector, the connector member being adapted to be detachably fitted into an adapter member provided in the target connector to support the target ferrule, in such a manner as to allow the ferrule to be butted against the target ferrule, and then locked to the adapter member to maintain the butting between the ferrule and the target ferrule, by an action of a lock operation portion provided in the connector member;

unlocking means supporting the connector member while allowing the connector member to be freely moved within a given distance along a butting direction of the ferrule and the target ferrule, the unlocking means being adapted, when it is moved toward a side opposite to the target connector along the butting direction, to operate the lock operation portion to release the locked state between the connector member and the adapter member;

a generally cylindrical-shaped joining member protruding toward the target connector along the butting direction, the joining member being adapted to be fixed to a cylindrical portion of the target connector protruding toward the connector member while surrounding a periphery of the adapter member along the butting direction, and, when it is fixed to the cylindrical portion, to form an overlapping region with the cylindrical portion along the butting direction; and a housing body supporting the joining member, and supporting the unlocking means while allowing the unlocking means to be slidably moved within a given distance along the butting direction, wherein:

the waterproof connector is adapted to be connected to the target connector in such a manner that the housing body is moved toward the target connector along the butting direction to allow the unlocking means supported by the housing body to be moved closer to the connector member supported by the unlocking means and then allow the connector member supported by the unlocking means to be moved closer to the adapter member and fitted into the adapter member, while allowing the joining member supported by the housing body to be moved closer to the cylindrical portion, and then the joining member is fixed to the cylindrical portion while slidingly moving the housing body along the butting direction; and the waterproof connector is adapted to be released from the connection with the target connector in such a manner that the fixing between the joining member and the cylindrical portion is released while slidingly moving the housing body along the butting direction, and then the housing body is moved toward the side opposite to the target connector along the butting direction to allow the joining member supported by the housing body to be moved away from the cylindrical portion, and allow the unlocking means supported by the housing body to be moved away from the connector member supported by the unlocking means, whereby the unlocking means is operable to operate the lock operation portion provided in the connector member, to release the locked state between the adapter member and the connector member, and to move the connector member supported thereby away from the adapter member to release the fitting between the connector member and the adapter member.

2. The waterproof connector of as defined in claim 1, which comprises an elastic member disposed between the unlocking means and the housing body, wherein the unlocking means is constantly biased by the elastic member, toward the target connector along the butting direction.

3. The waterproof connector as defined in claim 1, which comprises a coupling member disposed in a space defined by two concave portions formed in respective ones of an outer wall of the unlocking means and an inner wall of the housing body and communicated in a direction intersecting with the butting direction, wherein the housing body supports the unlocking means through the coupling member, to allow the unlocking means to be slidably moved within a given distance along the butting direction.

4. The waterproof connector as defined in claim 3, wherein the unlocking means supported by the housing body is adapted to be moved closer to the connector member through the coupling member.

5. The waterproof connector as defined in claim 3, wherein the unlocking means supported by the housing body is adapted to be moved away from to the connector member through the coupling member.

6. The waterproof connector as defined in claim 1, wherein the connector member is supported by the unlocking member in a freely movable manner along the butting direction, in such a manner as to penetrate through a through-hole formed in the unlocking means, wherein a movement of the connector member toward the target connector is restricted through a collision between a protrusion provided on an outer surface of the connector member and a front wall of the unlocking means defining a front opening of the through-hole, in the butting direction, and a movement of the connector member toward the side opposite to the target connector is restricted through a collision between a collision member provided at a rear end of the connector member and a rear wall of the unlocking means defining a rear opening of the through-hole, in the butting direction.

7. The waterproof connector as defined in claim 6, wherein the connector member supported by the unlocking means is adapted to be moved closer to the adapter member by means of the collision between the protrusion provided on the outer surface of the connector member and the front wall of the unlocking means defining the front opening of the through-hole, in the butting direction.

8. The waterproof connector as defined in claim 6, wherein the connector member supported by the unlocking means is adapted to be moved away from the adapter member by means of the collision between the collision member provided at the rear end of the connector member and the rear wall of the unlocking means defining the rear opening of the through-hole, in the butting direction.

9. The waterproof connector as defined in claim 1, wherein the lock operation portion has a tab formed to protrude in the butting direction and have a distal end region protruding toward the lock operation portion to wrap around a free end of the lock operation portion, wherein the unlocking means is adapted to operate the lock operation portion using the tab to release the locked state between the adapter member and the connector member.

10. The waterproof connector as defined in claim 1, wherein the joining member is freely fitted onto the housing body.

11. The waterproof connector as defined in claim 1, wherein the housing body has a tubular portion protruding toward the target connector along the butting direction to form an overlapping region with an inner periphery of the cylindrical portion along the butting direction when the joining member is fixed to the cylindrical portion, wherein, when the waterproof connector is connected to the target connector, the joining member is disposed to cover an outer periphery of the cylindrical portion of the target connector, and the cylindrical portion of the target connector is inserted in a gap defined between the joining member and the tubular portion of waterproof connector.

12. The waterproof connector as defined in claim 1, which comprises a holding member disposed within the housing body and fixed to a rigid cord member extending inside the housing body together with an optical fiber connected to the ferrule, the holding member being adapted, when the rigid cord member is pulled toward the side opposite to the target connector along the butting direction, to be brought into contact with an inner wall of the housing body to reduce a force to be applied to the optical fiber.

13. The waterproof connector as defined in claim 1, wherein the connector member has a structure of an LC connector.

14. A waterproof device comprising the waterproof connector as defined in claim 1, and a target connector connectable with the waterproof connector.

15. A waterproof connector comprising:
- a connector member supporting a ferrule to be butted against a target ferrule disposed in a target connector, the connector member being adapted to be locked to an adapter member of the target connector to maintain the butting between the ferrule and the target ferrule, by an action of a lock operation portion provided in the connector member;
- unlocking means supporting the connector member while allowing the connector member to be freely moved along a butting direction of the ferrule and the target ferrule, the unlocking means being adapted, when it is moved toward a side opposite to the target connector along the butting direction, to operate the lock operation portion to release the locked state between the connector member and the adapter member; and
- a housing body supporting the unlocking means while allowing the unlocking means to be slidably moved along the butting direction, wherein:

the waterproof connector is adapted to be connected to the target connector in such a manner that the housing body is moved toward the target connector along the butting direction to allow the unlocking means supported by the housing body to be moved closer to the connector member and then allow the connector member supported by the unlocking means to be moved closer to the adapter member and fitted into the adapter member; and the waterproof connector is adapted to be released from the connection with the target connector in such a manner that the housing body is moved toward the side opposite to the target connector along the butting direction to allow the unlocking means supported by the housing body to be moved away from the connector member supported by the unlocking means, whereby the unlocking means is operable to operate the lock operation portion provided in the connector member, to release the locked state between the adapter member and the connector member, and to move the connector member supported thereby away from the adapter member to release the fitting between the connector member and the adapter member.

* * * * *